United States Patent
Fu et al.

(10) Patent No.: US 12,436,879 B2
(45) Date of Patent: Oct. 7, 2025

(54) METHODS OF UPDATING ALLOCATION STATE OF LOGICAL BLOCK IN LOGICAL BLOCK MANAGEMENT TABLE

(71) Applicant: YANGTZE MEMORY TECHNOLOGIES CO., LTD., Wuhan (CN)

(72) Inventors: Hai Fu, Wuhan (CN); Hongbo Wang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 39 days.

(21) Appl. No.: 18/542,183

(22) Filed: Dec. 15, 2023

(65) Prior Publication Data
US 2025/0021475 A1     Jan. 16, 2025

Related U.S. Application Data

(63) Continuation of application No. PCT/CN2023/106822, filed on Jul. 11, 2023.

(51) Int. Cl.
*G06F 12/00* (2006.01)
*G06F 12/02* (2006.01)

(52) U.S. Cl.
CPC .. *G06F 12/0246* (2013.01); *G06F 2212/7201* (2013.01)

(58) Field of Classification Search
CPC ......... G06F 12/0246; G06F 2212/7201; G06F 12/0292; G06F 3/0604; G06F 3/0658; G06F 2212/1016
USPC .......................................................... 711/103
See application file for complete search history.

(56) References Cited

U.S. PATENT DOCUMENTS

| | | | |
|---|---|---|---|
| 11,755,471 B2 * | 9/2023 | Hu .............. | G06F 12/0653 711/154 |
| 2012/0036287 A1 * | 2/2012 | Lee ................. | G06F 3/061 710/22 |
| 2013/0151830 A1 | 6/2013 | Post et al. | |
| 2021/0286671 A1 * | 9/2021 | Amaki .......... | G06F 11/1048 |
| 2022/0004332 A1 | 1/2022 | Kang et al. | |

(Continued)

FOREIGN PATENT DOCUMENTS

| CN | 1400531 A | 3/2003 |
|---|---|---|
| CN | 113900585 A | 1/2022 |
| TW | 200945047 A | 11/2009 |

(Continued)

*Primary Examiner* — Mardochee Chery
(74) *Attorney, Agent, or Firm* — BAYES PLLC

(57) ABSTRACT

In some examples of the present disclosure, a ring queue may be constructed according to a number of first logical blocks, and the number of elements of the ring queue may be the same as the number of first logical blocks. For example, a first input first output (FIFO) ring queue with a depth of M is initialized to manage the resource of the first logical block. Each element in the ring queue can store an identity of a corresponding first logical block and an allocation state of the first logical block, for example, a first element of the ring queue stores an identity (ID=1) of a first one of the first logical blocks, . . . , a M-th element stores an identity (ID=M) of a M-th one of the first logical blocks, and an initial allocation state of each first logical block may be configured as the unallocated first state.

20 Claims, 16 Drawing Sheets

(56) References Cited

U.S. PATENT DOCUMENTS

2024/0338322 A1* 10/2024 Shveidel ............... G06F 3/0659

FOREIGN PATENT DOCUMENTS

| TW | I545434 B | 8/2016 |
|----|-----------|--------|
| WO | 2006019496 A1 | 2/2006 |

* cited by examiner

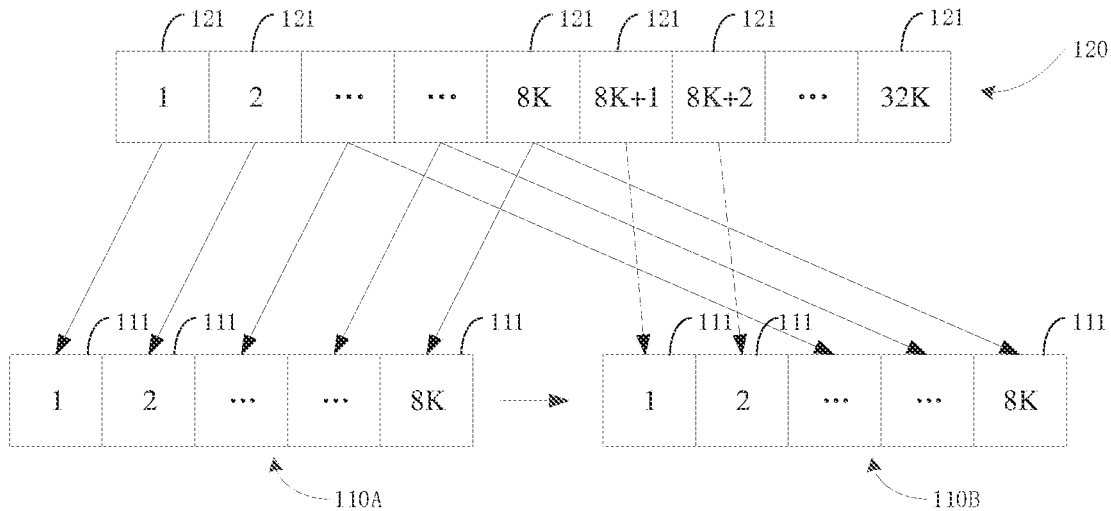

FIG. 4 provide a logical block management table, the logical block management table includes a first sequence corresponding to identities of M first logical blocks, and the identities of the M first logical blocks are constructed as a ring queue and allocation states of the M first logical blocks are managed through the logical block management table, wherein M is an integer greater than or equal to 2 — S502 according to an order of the identities of the M first logical blocks in the ring queue, one first logical block whose allocation state is the first state representing the unallocated state is allocated to one second logical block among N second logical blocks, wherein N is an integer greater than M, and the allocation state of the first logical block is updated from the first state to the second state representing the allocated state in the logical block management table — S504

FIG. 5

| Logical Block Management Table A | | |
|---|---|---|
| Identity of First Logical Block | Identity of Second Logical Block | State |
| 1 | 0 | First State |
| 2 | 0 | First State |
| ...... | ...... | ...... |
| M | 0 | First State |

| Logical Block Management Table A |||
| :---: | :---: | :---: |
| Identity of First Logical Block | Identity of Second Logical Block | State |
| 1 | 0 | First State |
| 2 | 0 | First State |
| ...... | ...... | ...... |
| M−Y+1 | X | Third State |
| ...... | ...... | ...... |
| M | Z | Third State |

FIG. 12

| Logical Block Management Table A |||
| :---: | :---: | :---: |
| Identity of First Logical Block | Identity of Second Logical Block | State |
| 1 | 1 | Second State |
| 2 | 0 | First State |
| ...... | ...... | ...... |
| M-Y+1 | X | Third State |
| ...... | ...... | ...... |
| M | Z | Third State |

FIG. 13

| Logical Block Management Table A | | |
|---|---|---|
| Identity of First Logical Block | Identity of Second Logical Block | State |
| 1 | 1 | Second State |
| 2 | 2 | Second State |
| ...... | ...... | ...... |
| M-Y | M-Y | Second State |
| M-Y+1 | X | Third State |
| ...... | ...... | ...... |
| M | Z | Third State |

FIG. 14

| Logical Block Management Table A | | |
|---|---|---|
| Identity of First Logical Block | Identity of Second Logical Block | State |
| 1 | M−Y+1 | Second State |
| 2 | 2 | Second State |
| ...... | ...... | ...... |
| M−Y | M−Y | Second State |
| M−Y+1 | X | Third State |
| ...... | ...... | ...... |
| M | Z | Third State |

FIG. 15

| Logical Block Management Table B | | |
|---|---|---|
| Identity of Second Logical Block | Identity of First Logical Block | State |
| 1 | 0 | First State |
| 2 | 0 | First State |
| ...... | ...... | ...... |
| N | 0 | First State |

FIG. 16

| Logical Block Management Table B | | |
|---|---|---|
| Identity of Second Logical Block | Identity of First Logical Block | State |
| 1 | 0 | First State |
| 2 | 0 | First State |
| ...... | ...... | ...... |
| X | M−Y+1 | Third State |
| ...... | ...... | ...... |
| Z | M | Third State |
| ...... | ...... | ...... |
| N | 0 | First State |

FIG. 17

| Logical Block Management Table B | | |
|---|---|---|
| Identity of Second Logical Block | Identity of First Logical Block | State |
| 1 | 1 | Second State |
| 2 | 0 | First State |
| ...... | ...... | ...... |
| X | M−Y+1 | Third State |
| ...... | ...... | ...... |
| Z | M | Third State |
| ...... | ...... | ...... |
| N | 0 | First State |

FIG. 18

| Logical Block Management Table B |||
|---|---|---|
| Identity of Second Logical Block | Identity of First Logical Block | State |
| 1 | 1 | Second State |
| 2 | 2 | Second State |
| ...... | ...... | ...... |
| 0X5999 | M-Y | Second State |
| N | 0 | First State |

FIG. 19

| Logical Block Management Table B |||
| :---: | :---: | :---: |
| Identity of Second Logical Block | Identity of First Logical Block | State |
| 1 | 0X7FFF | First State |
| 2 | 2 | Second State |
| ...... | ...... | ...... |
| 0X5999 | M-Y | Second State |
| ...... | ...... | ...... |
| 0X6E2D | 1 | Second State |
| ...... | ...... | ...... |
| N | 0 | First State |

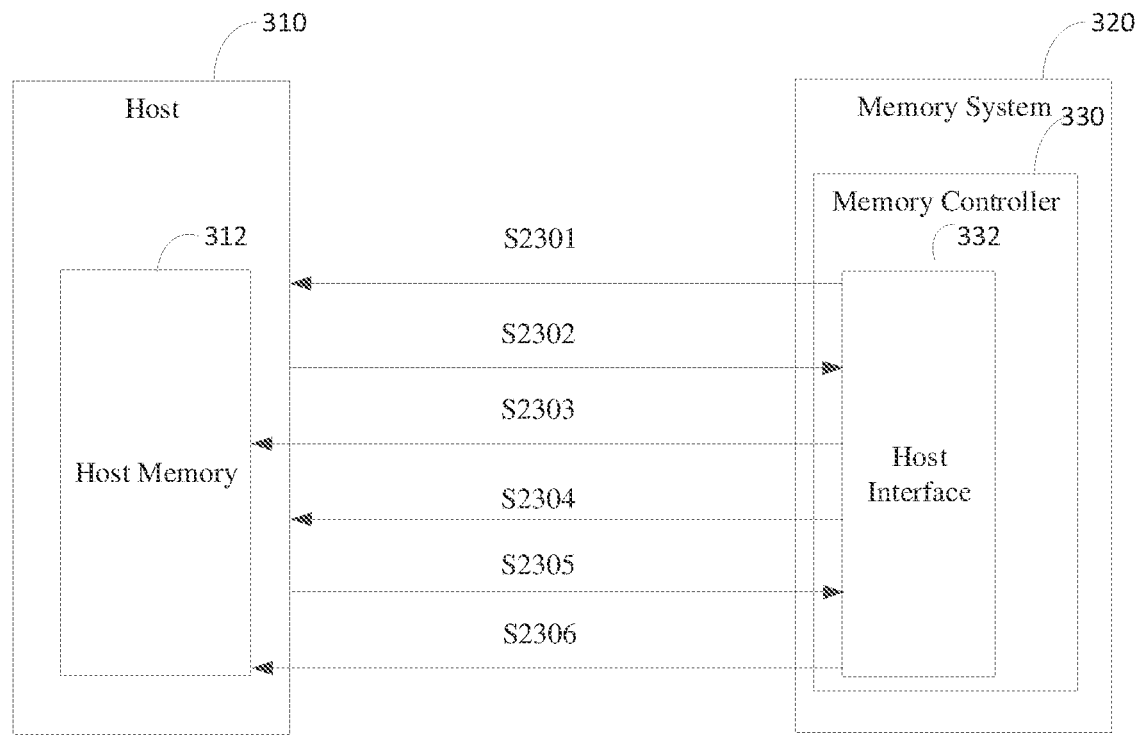

S2301, send first logical block management table
S2302, request L2P mapping table corresponding to the second logical block included in the first logical block management table
S2303, send L2P mapping table corresponding to the second logical block included in the first logical block management table
S2304, send second logical block management table
S2305, request L2P mapping table corresponding to the second logical block included in the second logical block management table
S2306, send L2P mapping table corresponding to the second logical block included in the second logical block management table

FIG. 23

METHODS OF UPDATING ALLOCATION STATE OF LOGICAL BLOCK IN LOGICAL BLOCK MANAGEMENT TABLE

CROSS-REFERENCE TO RELATED APPLICATIONS

This application is a continuation of International Application No. PCT/CN2023/106822, filed on Jul. 11, 2023, which is incorporated herein by reference in its entirety.

TECHNICAL FIELD

The present disclosure relates to the field of storage technologies, relating to but not limited to, a method of operating a memory system, a memory system, and a storage medium.

BACKGROUND

Memory systems can perform mappings from logical addresses associated with data and recognizable by hosts to physical addresses for storing data in storage spaces, and the mappings between the logical addresses and the physical addresses (L2P mappings) can constitute Logical-to-physical (L2P) mapping tables. Memory controllers of the memory systems can manage and allocate logical block resources formed by dividing the storage spaces, recommend appropriate logical block resources to the hosts, and cache L2P mapping relationships corresponding to the appropriate logical block resources on host sides, thereby improving performances of the memory systems. It should be noted that the information disclosed in the Background section above is only for enhancing the understanding of the background of the present disclosure, and thus may include information that does not constitute prior art known to those of ordinary skill in the art.

SUMMARY

According to one aspect of the present disclosure, a method of operating a memory system is provided. The method may include providing a logical block management table. The logical block management table may include a first sequence corresponding to identities of M first logical blocks. The identities of the M first logical blocks may be constructed as a ring queue, and allocation states of the M first logical blocks may be managed through the logical block management table, where M is an integer greater than or equal to 2. The method may include allocating, according to an order of the identities of the M first logical blocks in the ring queue. One first logical block whose allocation state may be a first state representing an unallocated state to one second logical block among N second logical blocks, where N is an integer greater than M. The method may include updating the allocation state of the one first logical block in the logical block management table from the first state to a second state representing an allocated state.

In some implementations, M may represent a number of logical blocks supported by a memory controller of the memory system in an HPB mode, and the N second logical blocks may cover all physical addresses of a memory device of the memory system.

In some implementations, in a case of no first logical block whose corresponding allocation state is the first state in the ring queue, the method may include de-allocating the second logical block corresponding to the first logical block that is first updated to the second state, and updating the allocation state corresponding to the first logical block that is first identified as the second state to the first state.

In some implementations, the ring queue may include a pointer configured to sequentially point to one of the M first logical blocks according to an order of the identities of the M first logical blocks in the ring queue. In some implementations, in response to the allocation state of the first logical block pointed to by the pointer being the second state, the method may include de-allocating the second logical block corresponding to the first logical block that is first updated to the second state, and updating the allocation state corresponding to the first logical block that is first identified as the second state to the first state.

In some implementations, the method may include allocating the first logical block pointed to by the pointer to one second logical block among the N second logical blocks, and pointing the pointer to a next first logical block according to the order of the identities of the M first logical blocks in the ring queue.

In some implementations, the method may include allocating Y first logical blocks whose allocation state is the first state to Y second logical blocks among the N second logical blocks, where Y is an integer greater than 1 and smaller than M. In some implementations, the method may include updating the allocation states of the Y first logical blocks in the logical block management table from the first state to a third state representing an allocated and pinned state.

In some implementations, the allocating the Y first logical blocks whose allocation state is the first state to the Y second logical blocks among the N second logical blocks may include allocating Y consecutive first logical blocks whose allocation state is the first state in the ring queue to the Y second logical blocks.

In some implementations, the first logical block whose allocation state is the third state may be skipped according to the order of the identities of the M first logical blocks in the ring queue.

In some implementations, the logical block management table may further include a second sequence corresponding to identities of the N second logical blocks. In some implementations, the method may further include updating the identity of the one first logical block or the identity of the one second logical block in the logical block management table.

In some implementations, a number of elements in the ring queue may be the same as a number of first logical blocks, and each element stores the identity and the allocation state of a corresponding first logical block.

In some implementations, a size of the first logical block is the same as a size of the second logical block.

In some implementations, after updating the logical block management table, the method may include sending the logical block management table to a host.

In some implementations, the method may include sending an L2P mapping table corresponding to the one second logical block to the host.

According to another aspect of the present disclosure, a memory system is provided. The memory system may include a memory device and a memory controller coupled to the memory device and configured to control the memory device to perform a data storage operation. The memory controller may include an interface communicatively coupled to a host. The interface may be configured to sequentially send to the host at least part of mapping information in a first logical block management table and a second logical block management table. The first logical block management table and the second logical block management table may respectively represent a mapping relationship between a first logical block and a second logical block at different times. Each of the first logical block management table and the second logical block management table may include a first sequence corresponding to identities of M first logical blocks. The identities of the M first logical blocks may be constructed as a ring queue and allocation states of the M first logical blocks are managed through the first and second logical block management tables, where M is an integer greater than or equal to 2. The first logical block management table and the second logical block management table may respectively include identities of K first logical blocks whose allocation state is a second state representing an allocated state, and identities of K second logical blocks among N second logical blocks to which the K first logical blocks are allocated, at the different times, where K is an integer greater than 1 and less than or equal to M, and N is an integer greater than M. One first logical block allocated first among the K first logical blocks corresponding to the first logical block management table may be updated and allocated to one second logical block among the K second logical blocks in the second logical block management table, to represent an update of the mapping relationship of the second logical block management table relative to the mapping relationship of the first logical block management table.

In some implementations, M may represent a number of logical blocks supported by the memory controller of the memory system in an HPB mode, and the N second logical blocks may cover all physical addresses of the memory device of the memory system.

In some implementations, both the first logical block management table and the second logical block management table may include identities of Y first logical blocks whose allocation state is a third state representing an allocated and pinned state and identities of Y second logical blocks to which the Y first logical blocks are allocated, where Y is an integer greater than 1, and a sum of Y and K is less than or equal to M. In some implementations, the interface may be configured to send to the host K pieces of mapping information in the second logical block management table that are updated relative to the first logical block management table.

In some implementations, the interface may be further configured to send to the host an L2P mapping table corresponding to the one second logical block.

According to a further aspect of the present disclosure, a memory system is provided. The memory system may include a memory device, and a memory controller coupled to the memory device and configured to control the memory device to perform a data storage operation. The memory controller may include an interface communicatively coupled to a host. The interface may be configured to sequentially send to the host a first mapping relationship and a second mapping relationship upon trigger of two adjacent updates of a logical block management table. The first mapping relationship may include P pieces of mapping information of a first logical block and a second logical block. The P pieces of mapping information may be included in a first logical block management table, and the second mapping relationship may include Q pieces of mapping information of the first logical block and the second logical block. The Q pieces of mapping information may be in the second logical block management table. Each of the first logical block management table and the second logical block management table may include a first sequence corresponding to identities of M first logical blocks. The identities of the M first logical blocks may be constructed as a ring queue and allocation states of the M first logical blocks are managed through the logical block management table, where M is an integer greater than or equal to 2, and both P and Q are integers greater than or equal to 1 and less than or equal to M. One first logical block allocated first among the M first logical blocks corresponding to the first logical block management table may be updated and allocated to one second logical block among Q second logical blocks in the second logical block management table, to represent an update of the mapping relationship in the second logical block management table relative to the mapping relationship in the first logical block management table.

In some implementations, M may represent a number of logical blocks supported by the memory controller of the memory system in an HPB mode, and a number of the second logical blocks may be N, where N is an integer greater than M, and the N second logical blocks may cover all physical addresses of the memory device of the memory system. In some implementations, the interface may be further configured to send to the host an L2P mapping table corresponding to the one second logical block.

According to yet another aspect of the present disclosure, non-transitory computer-readable storage medium storing instructions is provided. The instructions, which when executed by a processor, may cause the processor to provide a logical block management table. The logical block management table may include a first sequence corresponding to identities of M first logical blocks. The identities of the M first logical blocks may be constructed as a ring queue, and allocation states of the M first logical blocks may be managed through the logical block management table, where M is an integer greater than or equal to 2. The instructions, which when executed by a processor, may cause the processor to allocate, according to an order of the identities of the M first logical blocks in the ring queue, one first logical block whose allocation state is a first state representing an unallocated state to one second logical block among N second logical blocks, where N is an integer greater than M, and updating the allocation state of the one first logical block in the logical block management table from the first state to a second state representing an allocated state.

It should be noted that the above general description and the following detailed description are merely example and explanatory and should not be construed as limiting of the disclosure.

BRIEF DESCRIPTION OF THE DRAWINGS

The drawings here are incorporated into the specification and constitute a part of the specification, show examples in accordance with the present disclosure, and are used together with the specification to explain the principle of the present disclosure. Obviously, the drawings in the following description are only some examples of the present disclosure. Other drawings may be obtained based on these drawings without creative effort.

FIG. 4 shows a schematic diagram of performing management by a memory system when selectively providing part of L2P mapping tables to a host.

FIG. 5 shows a schematic flowchart of a method for operating a memory system, according to some examples of the present disclosure.

FIG. 12 shows a schematic diagram of a logical block management table, according to some examples of the present disclosure.

FIG. 13 shows a schematic diagram of a logical block management table, according to some examples of the present disclosure.

FIG. 14 shows a schematic diagram of a logical block management table, according to some examples of the present disclosure.

FIG. 15 shows a schematic diagram of a logical block management table, according to some examples of the present disclosure.

FIG. 16 shows a schematic diagram of another logical block management table, according to some examples of the present disclosure.

FIG. 17 shows a schematic diagram of another logical block management table, according to some examples of the present disclosure.

FIG. 18 shows a schematic diagram of another logical block management table, according to some examples of the present disclosure.

FIG. 19 shows a schematic diagram of another logical block management table, according to some examples of the present disclosure.

FIG. 23 shows a schematic diagram of interaction between a host and a memory system, according to some examples of the present disclosure.

DETAILED DESCRIPTION

Figure 1:
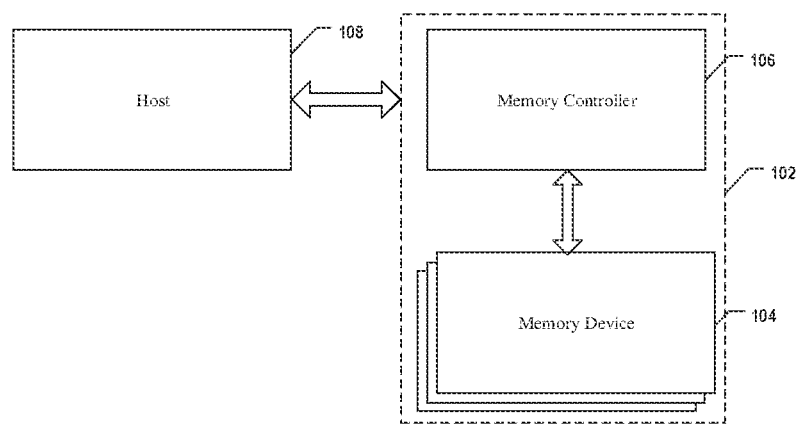
FIG. 1 shows a block diagram of an example system with a memory device, according to some examples of the present disclosure.

Examples will now be described more fully with reference to the accompanying drawings. However, the examples may be implemented in a variety of forms and should not be construed as being limited to examples set forth herein; rather, these examples are provided so that the present disclosure will be more complete and comprehensive so as to convey the idea of the examples. The described features, structures, or characteristics may be combined in any suitable manner in one or more examples.

In addition, the drawings are merely schematic representations of the present disclosure and are not necessarily drawn to scale. The same reference numerals in the drawings denote the same or similar parts, and the repeated description thereof will be omitted. Some of the block diagrams shown in the figures are functional entities and do not necessarily correspond to physically or logically separate entities. These functional entities may be implemented in software, or implemented in one or more hardware modules or integrated circuits, or implemented in different networks and/or processor devices and/or microcontroller devices.

Furthermore, in the description of the present disclosure, "plurality" means at least two, such as two, three, etc., unless otherwise specifically defined. The terms "first" and "second" are used for purpose of description only, and cannot be interpreted as indicating or implying relative importance or implicitly indicating the number of indicated technical features. Thus, a feature defined with "first" or "second" may explicitly or implicitly include one or more of the features.

FIG. 1 shows a block diagram of an example system 100 with a memory device, according to some examples of the present disclosure. The system 100 may be a mobile phone, a desktop computer, a laptop computer, a tablet computer, a vehicle computer, a game console, a printer, a positioning device, a wearable electronic device, a smart sensor, a virtual reality (VR) device, an augmented reality (AR) device or any other suitable electronic devices having a memory therein. As shown in FIG. 1, the system 100 may include a host 108 and a memory system 102 having one or more memory devices 104 and a memory controller 106. The host 108 may be a system-on-chip (SoC) (e.g., an application processor (AP)) or a processor (e.g., a central processing unit (CPU)) of an electronic device. The host 108 may be configured to send data to or receive data from the memory device 104.

According to some implementations, the memory controller 106 is coupled to the memory device 104 and the host 108 and is configured to control the memory device 104. The memory controller 106 may manage data stored in the memory device 104 and is in communication with the host 108. In some implementations, the memory controller 106 is designed to operate in a low-duty-cycle environment such as a secure digital (SD) card, a compact flash (CF) card, a universal serial bus (USB) flash drive, or other media for use in an electronic device such as a personal computer, a digital camera, a mobile phone, and the like. In some implementations, the memory controller 106 is designed to operate in a high-duty-cycle environment of a solid-state disk (SSD) or an embedded multimedia card (eMMC), which is used as a data storage of a mobile device such as a smart phone, a tablet computer, a laptop computer, and an enterprise storage array.

The memory controller 106 may be configured to control an operation of the memory device 104, such as read, erase and program operations. The memory controller 106 may further be configured to manage various functions related to data stored or to be stored in the memory device 104, including but not limited to bad block management, garbage collection, logical-to-physical address conversion, wear leveling, and the like. In some implementations, the memory controller 106 is further configured to process error correction code (ECC) on data read from or written to the memory device 104. The memory controller 106 may further perform any other suitable functions, such as formatting the memory device 104. The memory controller 106 may communicate with an external device (e.g., the host 108) according to a particular communication protocol. For example, the memory controller 106 may communicate with the external device through at least one of various interface protocols, such as a USB protocol, a multi-media card (MMC) protocol, a peripheral component interconnect (PCI) protocol, a PCI express (PCI-E) protocol, an advanced technology attachment (ATA) protocol, a serial ATA protocol, a parallel ATA protocol, a small computer small interface (SCSI) protocol, an enhanced small disk interface (ESDI) protocol, an integrated drive electronics (IDE) protocol, a firewire protocol, etc.

Figure 2A:
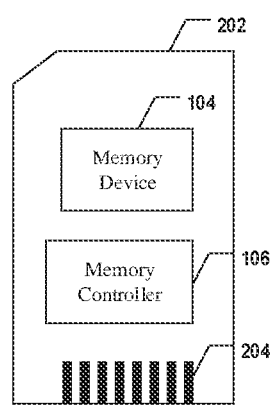
FIG. 2*a* shows a schematic diagram of a memory card integrated with a memory controller and a memory device, according to some examples of the present disclosure.
Figure 2B:
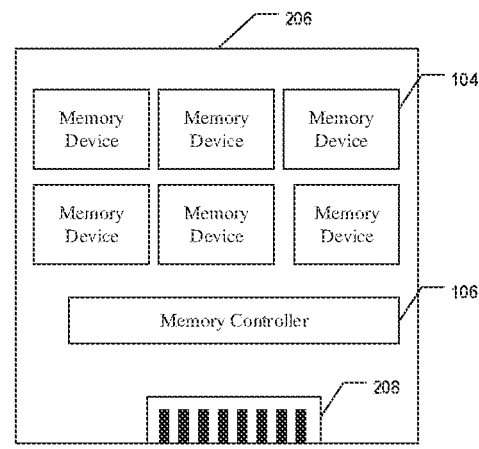
FIG. 2b shows a schematic diagram of an SSD integrated with a memory controller and a memory device, according to some examples of the present disclosure.

The memory controller 106 and one or more memory devices 104 may be integrated into various types of storage devices, e.g., included in the same package (e.g., a universal flash storage (UFS) package or an eMMC package). That is, the memory system 102 may be implemented and packaged into different types of end electronic products. In an example as shown in FIG. 2a, the memory controller 106 and a single memory device 104 may be integrated into a memory card 202. The memory card 202 may include a PC card (a Personal Computer Memory Card International Association (PCMCIA) card), a CF card, a smart media (SM) card, a memory stick, a multimedia card (MMC, reduced size (RS)-MMC, MMCmicro), a secure digital (SD) card (SD, miniSD, microSD, SD high capacity (SDHC)), a UFS, etc. The memory card 202 may further include a memory card connector 204 that couples a memory card 202 with a host (e.g., the host 108 in FIG. 1). In another example as shown in FIG. 2b, the memory controller 106 and a plurality of memory devices 104 may be integrated into an SSD 206. The SSD 206 may further include an SSD connector 208 that couples the SSD 206 to a host (e.g., the host 108 in FIG. 1). In some implementations, a storage capacity and/or an operating speed of the SSD 206 is greater than a storage capacity and/or an operating speed of the memory card 202.

Figure 3:
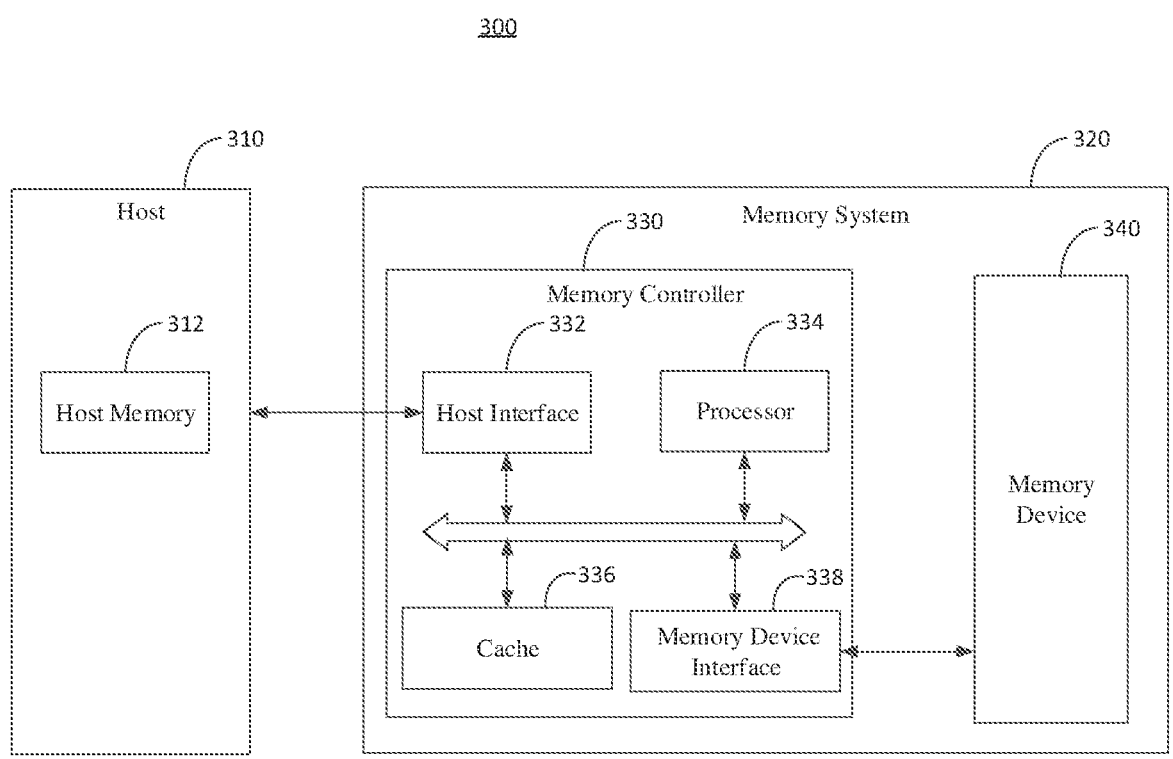
FIG. 3 shows a schematic diagram of a system including a host and a memory system, according to some examples of the disclosure.

FIG. 3 shows a schematic diagram of a system 300 including a host 310 and a memory system 320 according to some examples. The system 300 in FIG. 3 may correspond to the above system 100 with reference to FIG. 1, the host 310 in FIG. 3 may correspond to the above host 108 with reference to FIG. 1, and the memory system 320 in FIG. 3 may correspond to the above memory system 102 with reference to FIG. 1.

The memory system 320 may include a memory controller 330 and a memory device 340. The memory controller 330 may include a host interface 332, a processor 334, a cache 336, a memory device interface 338, and the memory controller 330 may receive a command of the host 310 through the host interface 332, and control an operation of the memory device 340 based on the received command by means of the processor 334. The memory controller 330 may communicate with the memory device 340 through the memory device interface 338 to control the operation of the memory device 340. The command received by the memory controller 330 through the host interface 332 and data involved in the command may be temporarily stored in the cache 336, and the cache 336 may further be configured to temporarily store data read by the memory device 340 to be transmitted to the host 310. In some examples, the cache 336 may further be configured to cache related information involved in other memory systems 320.

In some examples, the memory controller 330 may receive a data write command, a read command, etc. from the host 310 through the host interface 332, generate a command for controlling the operation of the memory device 340 based on the received command by means of the processor 334, and transmit the command to the memory device 340 through the memory device interface 338. The memory device 340 is configured to receive a command and an address from the memory controller 330, and access an area of a memory cell array of the memory controller 330 selected by this address. That is, the memory device 340 performs an internal operation corresponding to the command on the area selected by the address. For example, the memory device 340 may perform a program operation, a read operation, and an erase operation. During the program operation, the memory device 340 may program data into the area selected by the address. During the read operation, the memory device 340 may read the data from the area selected by the address. During the erase operation, the memory device 340 may erase data stored in the area selected by the address. In some examples, the memory device 340 may include one or more memory arrays of any type of memory cells, such as non-volatile memory cells, volatile memory cells, or any combination thereof. The memory device 340 may perform the write operation and the read operation in units of page, and may perform the erase operation in units of block.

In some examples, the memory system 320 may have a flash translation layer (FTL) in the memory controller 330, and may perform one or more command operations, internal operations, etc. by means of the FTL. For example, the memory controller 330 may control the memory device 340 in response to a request from the host 310. In addition, the memory controller 330 may perform the internal operation (for example, a garbage collection operation, a read reclamation operation, and a wear leveling operation) regardless of the request from the host 310. For example, the memory controller 330 may perform the above operations by running the FTL using a software. The FTL may be run by the processor 334 of the memory controller 330. Accordingly, various operations of the FTL may be performed by the processor 334.

An important operation of the FTL includes completing a mapping from a logical address space of the host 310 to a physical address space of the memory device 340, and each time the memory system 320 writes a piece of user data into the memory device 340, it records a mapping from a logical address of the piece of user data to a physical address of the piece of user data in the memory device 340. When the host 310 reads the piece of user data, the memory system 320 will read the piece of user data from the memory device 340 according to the mapping and then feedback it to the host 310.

In some examples, the operation performed by the command and the internal operation may be performed by the FTL, which may be performed by the address mapping operation of converting the logical address (LA) provided by the host 310 to the physical address (PA) of the memory device 340. L2P mapping information may be provided in a logical-to-physical mapping table (that is, an L2P mapping table) including logical address-to-physical address mapping data. With the expansion of the memory system 320, a size of the L2P mapping table inevitably increases. Therefore, a time spent by the memory system 320 searching for the L2P mapping table increases, which may reduce an operation speed of the memory system 320, especially of the memory system 320 not configured with a DRAM.

In some examples, the system 300 including the host 310 and the memory system 320 may have a host memory 312 in the host 310, and at least part of the L2P mapping tables in the memory system 320 is synchronized to the host memory 312, so that an address mapping operation may be preferentially performed in the host 310 to improve the performance of the memory system 320. For example, the host 310 transmits the L2P mapping information searched from the host memory 312 together with the read command to the memory system 320, the host interface 332 receives the read command and the L2P mapping information, and the processor 334 transmits the read command for reading the user data to the memory device 340 together with the physical address corresponding to the read command. The memory device 340 reads user data corresponding to the received read command. The read user data may be transferred to the memory controller 330 and may be transferred from the memory controller 330 to the host 310.

In order to synchronize at least part of the L2P mapping information in the memory system 320 to the host memory 312, the host 310 and the memory system 320 are configured to support this operation, which may be a host performance booster (HPB) operation or a host memory buffer (HMB) operation. When the memory system 320 provides the host 310 with all the L2P mapping tables stored in the memory system 320, the ability of the memory system 320 to support the corresponding operation may be limited, or it may be difficult for the host 310 to assign a storage space in the host memory 312 to store all the L2P mapping information, or the memory system 320 is limited by other functions. Therefore, the memory system 320 may selectively provide part of the L2P mapping tables to the host 310 instead of providing all the L2P mapping tables to the host 310.

FIG. 4 shows a schematic diagram of performing management by the memory system 320 when selectively providing part of L2P mapping tables to the host 310. The memory controller 330 can perform corresponding coverage expression of a physical address space of the memory device 340 by correspondingly using a logical address space divided into a plurality of logical blocks. Referring to FIG. 4, the logical address space can cover all the physical addresses of the memory device 340, the logical address space may be evenly divided into a plurality of second logical blocks 121 in the way that each logical block is the same size, and the plurality of second logical blocks 121 are compiled into a second logical block table 120 (region table). A size of each second logical block 121 may be configured according to actual needs, and the number of second logical blocks 121 is determined according to a size of the memory device 340 and the size of each second logical block 121. For example, referring to FIG. 4, the size of the memory device 340 is 512 G, and the size of the second logical block 121 is 16 M, then the number of second logical block 121 is 32 K, and a length of the second logical block table 120 is 32K.

When selectively providing the part of the L2P mapping tables to the host 310, the memory system 320 selects part of the second logical blocks 121 from the plurality of second logical blocks 121, and transfers L2P mapping tables corresponding to the prelected part of the second logical blocks 121 to the host 310 to be stored in the host memory 312 for calling by the host 310 when making a read request. The memory system 320 may configure a logical space to support the aforementioned operations, and divide the logical space into a plurality of first logical blocks, the number of first logical blocks is smaller than the number of second logical blocks. Referring to FIG. 4, a plurality of first logical blocks 111 may be compiled into a first logical block table (sub-region table). A size of the first logical block 111 may be set according to actual requirements, for example, the size of the first logical block 111 may be the same as that of the second logical block 121. For example, referring to FIG. 4, the size of the first logical block 111 may be 16 M, and the memory system 320 may configure a logical space of 128 G to support the aforementioned operations, then the number of first logical blocks 111 is 8K, a length of the first logical block table 110 is 8K, and the memory system 320 may configure the logical space that supports the aforementioned operations to be only available for recommending to the host 310 the L2P mapping tables corresponding to the 128 G physical address space in the memory device 340.

When selectively providing part of the L2P mapping tables to the host 310, the memory system 320 may select at least one second logical block 121 that meets a recommendation standard from the second logical block table 120, and perform the mapping with at least one first logical block 111 in the first logical block table 110, and recommend the mapping relationship between the first logical block 111 and the second logical block 121 to the host 310. After receiving the mapping relationship between the first logical block 111 and the second logical block 121, the host 310 requests the memory system 320 for an L2P mapping table corresponding to the second logical block 121. In response to this request, the memory system 320 sends the L2P mapping table corresponding to the second logical block 121 to the host 310 to be stored in the host memory 312.

When updating the part of the L2P mapping tables selectively provided by the memory system 320 to the host 310, referring to FIG. 4, before the update, 1 st to 8K-th second logical blocks 121 are screened out as the 8K second logical blocks 121 that meet the recommendation standard, which are mapped one-to-one with 8K first logical blocks 111 in the first logical block table 110 to form 8K mapping relationships 110A between the first logical blocks 111 and the second logical blocks 121. The mapping relationship 110A between the first logical block 111 and the second logical block 121 is recommended to the host 310, and the L2P mapping tables respectively corresponding to the 1st to 8K-th second logical blocks 121 are stored in the host memory 312. When there is a new second logical block 121 meeting the recommendation standard, for example, the (8K+1)th and (8K+2)th second logical blocks 121 in FIG. 4, it should search for a first logical block in the first logical block table 110 to be mapped with the new second logical block 121 meeting the recommendation standard. For example, referring to FIG. 4, the first one of the first logical block 111 is mapped with the (8K+1)th second logical block 121, the second one of the first logical block 111 is mapped with the (8K+2)th second logical block 121, so as to form new 8K mapping relationships 110B between the first logical blocks 111 and the second logical blocks 121, the mapping relationship 110B between the first logical block 111 and the second logical block 121 is recommended to the host 310, and the L2P mapping table stored in the host memory 312 is updated.

In the case that the memory system 320 selectively provides part of the L2P mapping tables to the host 310, when the memory system 320 searches for the first logical block 111 in the first logical block table 110 to be mapped with the second logical block 121 meeting the recommendation standard, the management of the mapping relationship is relatively complicated. Some examples of the present disclosure provide a way to quickly update the mapping relationship between the first logical block 111 and the second logical block 121 to improve the resource-management efficiency.

In examples of the present disclosure, the memory controller 330 in the memory system 320 stores the logical block management tables of the first logical block (such as the sub-region) and the second logical block (such as the region), and the memory controller 330 can manage and allocate a plurality of first logical blocks by means of the logical block management table. In some examples, when one second logical block among a plurality of second logical blocks meets the recommendation standard, one first logical block of the plurality of first logical blocks is allocated to this second logical block, and the correspondence is sent to the host 310. Upon receiving the correspondence, the host 310 can obtain an L2P mapping table corresponding to the one second logical block, which is stored in the memory system 320, thereby achieving to update the part of the L2P mapping tables to the host 310. In this way, the data-reading efficiency and the system performance may be improved.

FIG. 5 shows a schematic flowchart of a method for operating a memory system in some examples of the present disclosure. The method may be executed by the memory controller 330 in the memory system 320. As shown in FIG. 5, the method for operating the memory system provided in some examples of the present disclosure may include the following operations S502 and S504.

At S502, a logical block management table is provided, and the logical block management table includes a first sequence corresponding to identities of M first logical blocks, and the identities of the M first logical blocks are constructed as a ring queue and allocation states of the M first logical blocks are managed through the logical block management table, wherein M is an integer greater than or equal to 2.

In some examples of the present disclosure, the logical block management table includes a mapping relationship between a first logical block and a second logical block, and there may be the M first logical blocks. M may represent the number of logical blocks supported by the memory controller 330 of the memory system 320 in an HPB mode, and M may also represent the number of logical blocks supported by the memory controller 330 in the memory system 320 in an HMB mode. The M first logical blocks may cover part of a physical address space of the memory device 340 in the memory system 320. There may be N second logical blocks, and the N second logical blocks may cover part or all of physical addresses of the memory device 340 in the memory system 320. It should be noted that M is an integer greater than or equal to 1, which may be specifically configured in the memory controller 330, N is an integer greater than M, and a physical address space of the memory device 340 in the memory system 320 that is covered by the M first logical blocks is less than a physical address space of the memory device 340 in the memory system 320 that is covered by the N second logical blocks.

For example, for the 512 G memory system 320, the physical address space of the memory device 340 is 512 G, a storage space corresponding to the entire physical address space of the memory device 340 that may be covered by the N second logical blocks may be 512 G, and a storage space corresponding to part of the physical address space of the memory device 340 that the M first logical blocks can cover may be, for example, 128 G.

In some examples of the present disclosure, a size of the first logical block is the same as a size of the second logical block, for example, both the size of the first logical block and the size of the second logical block are 16 M. In some examples, the size of the first logical block may also be different from the size of the second logical block.

In examples of the present disclosure, the logical block management table may include the first sequence corresponding to the identities of the M first logical blocks. The identity of the first logical block may be an identity document (ID) of the first logical block, and each first logical block has its corresponding identity. The first sequence may be a column in the logical block management table, for example, a first column in the logical block management table A as shown in FIG. 11 to FIG. 15, or a second column in the logical block management table B as shown in FIG. 16 to FIG. 20. The logical block management table may also include a second sequence for representing an identity of the second logical block, the identity of the second logical block may be an ID of the second logical block, and each second logical block has its corresponding identity. The second sequence includes the identity of the second logical block allocated to each first logical block (when the first logical block is not allocated, the identity of the corresponding second logical block in the second sequence may be an initial value or a preset value, such as 0). The logical block management table may further include a third sequence, which includes the allocation state of each first logical block.

Specifically, the allocation state of the first logical block may include but not limited to a first state, a second state, and a third state. The first state may represent an "unallocated" state, the second state may represent an "allocated" state, and the third state may represent an "allocated and pinned" state. The "allocated" state may refer to an state in which the first logical block has been allocated to an available second logical block (for example, the second logical block meeting the recommendation standard), and the "allocated and pinned" state may refer to a state in which the first logical block has been in pinned allocation to a second logical block, and the second logical block to which the first logical block is allocated will substantially not change.

In some examples of the present disclosure, the ring queue may be constructed according to the number of first logical blocks, and the number of elements of the ring queue is the same as the number of first logical blocks. For example, a first input first output (FIFO) ring queue 600 with a depth of M is initialized to manage the resource of the first logical block, as shown in FIG. 6 to FIG. 10. Each element in the ring queue 600 can store an identity of a corresponding first logical block and an allocation state of the first logical block, for example, a first element of the ring queue 600 stores an identity (ID=1) of a first one of the first logical blocks, a second element of the ring queue 600 stores an identity (ID=2) of a second one of the first logical blocks, . . . , a M-th element stores an identity (ID=M) of a M-th one of the first logical blocks, and an initial allocation state of each first logical block may be configured as the "unallocated" first state.

Figure 6:
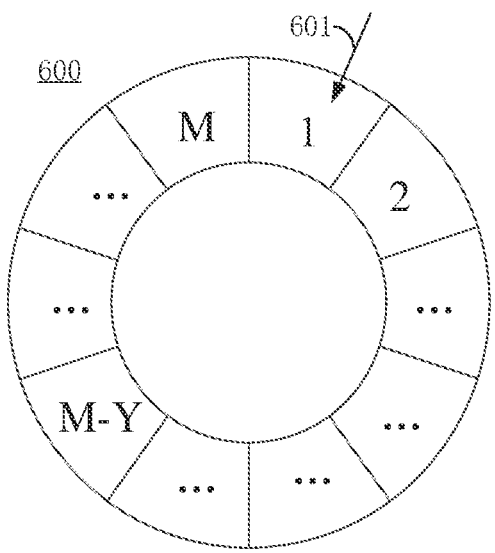
FIG. 6 shows a schematic diagram of a ring queue, according to some examples of the present disclosure.

In some examples, the ring queue 600 may include a pointer 601. In the initial state, the pointer 601 points to the first one of the first logical blocks in the ring queue 600, for example, as shown in FIG. 6, the pointer 601 points to the first logical block corresponding to the identity 1 in the initial state.

In the step S504, according to an order of the identities of the M first logical blocks in the ring queue, one first logical block whose allocation state is the first state representing the unallocated state is allocated to one second logical block among N second logical blocks, wherein N is an integer greater than M, and the allocation state of the first logical block is updated from the first state to the second state representing the allocated state in the logical block management table.

In some examples of the present disclosure, according to the order of the identities of the M first logical blocks in the ring queue, that is, according to an order of M elements in the ring queue (for example, the identity 1 is located in a first element (corresponding to the first one of the first logical blocks), the identity 2 is located in a second element (corresponding to the second one of the first logical blocks), . . . , the identity M is located in a M-th element (corresponding to the M-th one of the first logical blocks)), one of the first logical blocks whose allocation state is the first state representing the unallocated state is allocated to one of the N second logical blocks successively, and the allocation state of this first logical block is updated from the first state to the second state in the logical block management table.

In some examples, when one of the N second logical blocks meets the recommendation standard, the first logical block pointed to by the pointer of the ring queue whose allocation state is the first state may be allocated to the second logical block meeting the recommendation standard (an L2P mapping table corresponding to this second logical block is activated after being stored in the host memory 312, and this second logical block may also be referred to as an active second logical block). The pointer of the ring queue may point to the first logical blocks whose allocation state is the first state according to the order of the identities of the M first logical blocks in the ring queue.

In some examples, the M first logical blocks may respectively establish mapping relationships with the corresponding M second logical blocks, that is, all the first logical blocks in the logical block management table have been allocated. In this case, there is no first logical block whose corresponding allocation state is the first state in the ring queue. Here, the method may include de-allocating the second logical block corresponding to the first logical block in the ring queue that is first updated to the second state, and updating the allocation state corresponding to the first logical block that is first identified as the second state to the first state.

In some examples, there may be no first logical block whose corresponding allocation state is the first state in the ring queue, that is, the corresponding first logical blocks in the ring queue are all in the second state or the third state. In other words, all the first logical blocks have been allocated to the second logical blocks that meet the recommendation standard or the pinned second logical blocks. In this case, the first logical block that is first updated to the second state (that is, the first logical block that is first allocated to the second logical block meeting the recommendation standard) is first determined, the second logical block corresponding to this first logical block is de-allocated (which may also referred as to deactivated), that is, the mapping relationship between the first logical block and its corresponding second logical block is released, and the allocation state of the first logical block in the logical block management table is updated from the second state to the first state, so as to reallocate the first logical block to another second logical block meeting the recommendation standard.

In some examples, when there is no first logical block whose corresponding allocation state is the first state in the ring queue, the first logical block that is first allocated may be determined according to the order of the identities of the M first logical blocks in the ring queue. For example, with reference to FIG. 9, the ring queue 600 includes M identities, and none of the allocation states of the M first logical blocks corresponding to the M identities is the first state. The first one of the identities is the identity 1, and the first logical block corresponding to the identity 1 is the first one of the first logical blocks, and thus the first one of the first logical blocks is the first allocated first logical block.

Figures 20, 21:
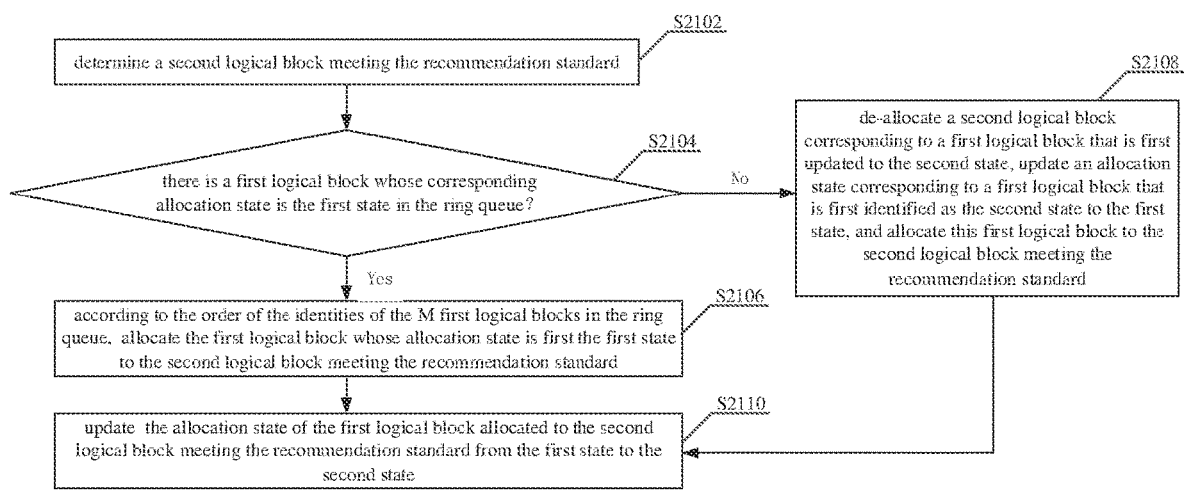
FIG. 20 shows a schematic diagram of another logical block management table, according to some examples of the present disclosure.
FIG. 21 shows a schematic flowchart of another method for operating a memory system, according to some examples of the present disclosure.

FIG. 21 shows a schematic flowchart of another method for operating a memory system according to some examples of the present disclosure. As shown in FIG. 21, the method for operating the memory system provided according to examples of the present disclosure may include the following operations S2102 to S2110.

At S2102, a second logical block meeting the recommendation standard is determined.

In some examples, when it is determined that there is the second logical block meeting the recommendation standard, the operation S2104 may be performed.

At S2104, it is determined whether there is a first logical block whose corresponding allocation state is the first state in the ring queue.

In some examples, if there is the first logical block whose corresponding allocation state is the first state in the ring queue, operation S2106 is performed; and if there is no first logical block whose corresponding allocation state is the first state in the ring queue logical block, operation S2108 is performed.

At S2106, according to the order of the identities of the M first logical blocks in the ring queue, the first logical block whose allocation state is first the first state is allocated to the second logical block meeting the recommendation standard.

At S2108, a second logical block corresponding to a first logical block that is first updated to the second state is de-allocated, an allocation state corresponding to a first logical block that is first identified as the second state is updated to the first state, and this first logical block is allocated to the second logical block meeting the recommendation standard.

At S2110, the allocation state of the first logical block allocated to the second logical block meeting the recommendation standard is updated from the first state to the second state.

For other contents of the example in FIG. 21, reference may be made to the description of the above method examples, and repeated descriptions will not be given.

In some examples, the ring queue includes a pointer configured to sequentially point to one of the M first logical blocks in the order of the identities of the M first logical blocks in the ring queue.

Figure 7:
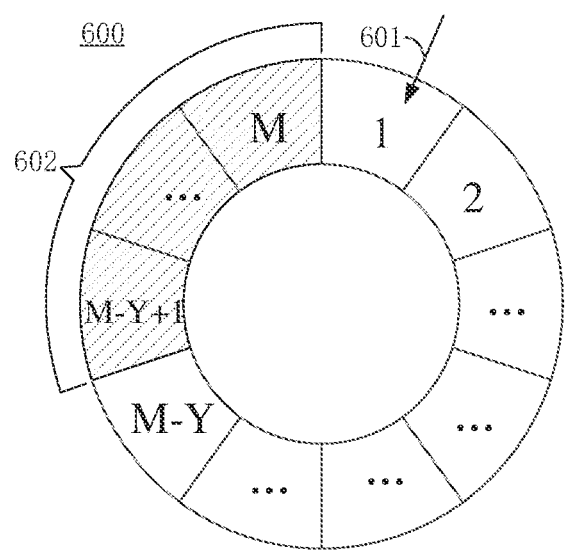
FIG. 7 shows a schematic diagram of a ring queue, according to some examples of the present disclosure.

For example, in an initial state, referring to FIG. 6, the pointer 601 points to the first one of the first logical blocks (that is, the first logical block corresponding to the identity 1) in the ring queue 600. Referring to FIG. 7, after the first one of the first logical blocks is allocated, the pointer 601 points to the second one of the first logical blocks (that is, the first logical block corresponding to the identity 2) in the ring queue 600, and so on. After the first logical block currently pointed to by the pointer 601 is allocated, the pointer in turn points to a first logical block next to the current first logical block.

In some examples, in response to the allocation state corresponding to the first logical block pointed to by the pointer being the first state, the first logical block pointed to by the pointer is allocated to a second logical block, and the pointer is made to in turn point to the next first logical block.

In some examples, in a case that the allocation state corresponding to the first logical block pointed to by the pointer is the first state, it means that the first logical block is allocatable, and this first logical block may be directly allocated to the second logical block currently meeting the recommendation standard, and the pointer is made to in turn point to the next first logical block.

In some examples, the method may further include: in response to the allocation state of the first logical block pointed to by the pointer being the second state, de-allocating the second logical block corresponding to the first logical block that is first updated to the second state, and updating the allocation state corresponding to the first logical block that is first identified as the second state to the first state.

In some examples, when the allocation state of the first logical block pointed to by the pointer is the second state, the first logical block pointed to by the pointer is the first logical block which is first updated to the second state. The second logical block corresponding to the first logical block pointed to by the pointer may be de-allocated. Thus, the first logical block to be allocated may be quickly located through the pointer.

In some examples, the method may further include allocating the first logical block pointed to by the pointer to a second logical block among the N second logical blocks, and pointing the pointer to the next first logical block.

For example, in a case that the first logical block pointed to by the pointer is the first one of the first logical blocks corresponding to the identity 1 and the allocation state of the first one of the first logical blocks is the second state, the method may include first de-allocating the second logical block to which the first one of the first logical blocks has been allocated, update the allocation state of the first one of the first logical blocks to the first state, allocate again the first one of the first logical blocks to the second logical block currently meeting the recommendation standard (not the same second logical block as the second logical block to which the first one of the first logical blocks was previously allocated), update the allocation state of the first one of the first logical blocks to the second state, and point the pointer to the second one of the first logical blocks corresponding to the identity 2.

Figure 22:
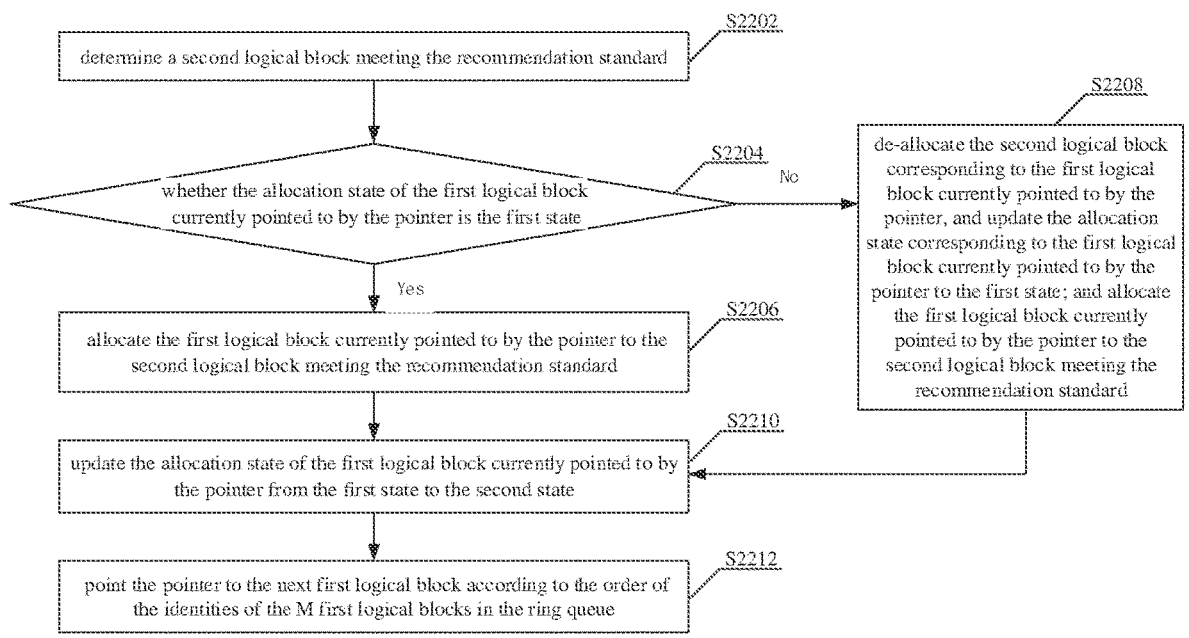
FIG. 22 shows a schematic flowchart of another method for operating a memory system, according to some examples of the present disclosure.

FIG. 22 shows a schematic flowchart of yet another method of operating a memory system in an example of the present disclosure. As shown in FIG. 22, the method for operating the memory system provided in examples of the present disclosure may include the following operations S2202 to S2212.

At S2202, a second logical block meeting the recommendation standard is determined.

In some examples, when it is determined that there is the second logical block meeting the recommendation standard, operation S2204 may be performed.

At S2204, it is determined whether an allocation state of a first logical block currently pointed to by the pointer is the first state.

In some examples, if the allocation state of the first logical block currently pointed to by the pointer is the first state, operation S2206 is performed; and if the allocation state of the first logical block currently pointed to by the pointer is not the first state, operation S2208 is performed.

At S2206, the first logical block currently pointed to by the pointer is allocated to the second logical block meeting the recommendation standard.

At S2208, the second logical block corresponding to the first logical block currently pointed to by the pointer is de-allocated, and the allocation state corresponding to the first logical block currently pointed to by the pointer is updated to the first state; and the first logical block currently pointed to by the pointer is allocated to the second logical block meeting the recommendation standard.

At S2210, the allocation state of the first logical block currently pointed to by the pointer is updated from the first state to the second state.

At S2212, the pointer is pointed to the next first logical block according to the order of the identities of the M first logical blocks in the ring queue.

For other contents of the example in FIG. 22, reference may be made to the description of the above method examples, and repeated descriptions will not be given.

In some examples, the method may further include allocating Y first logical blocks whose allocation state is the first state to Y second logical blocks among the N second logical blocks, wherein Y is an integer greater than 1 and less than M, and updating the allocation states of the Y first logical blocks from the first states to third states representing "allocated and pinned" states in the logical block management table.

In some examples, when the system is initialized, the Y second logical blocks among the N second logical blocks are used to store relevant configuration information, that is, these Y second logical blocks are logical blocks for storing the configuration information (also called pinned regions), and information stored in the Y second logical blocks (pinned regions) will substantially not change after the initialization.

In some examples, the Y first logical blocks in the first state are allocated for these Y second logical blocks (pinned regions), and the allocation states of the Y first logical blocks in the logical block management table are updated to the third states. After these Y first logical blocks are allocated to the Y second logical blocks (pinned regions), the allocation states corresponding to the Y first logical blocks will substantially not change. A mapping relationship between the Y first logical blocks and the Y second logical blocks (pinned regions) is sent to the host 310, and the host 310 will request L2P mapping tables respectively corresponding to the Y second logical blocks (pinned regions) according to the mapping relationship between the Y first logical blocks and the Y second logical blocks (pinned regions). The memory system 320 will send the L2P mapping tables respectively corresponding to the Y second logical blocks (pinned regions) to the host 310 to be stored in the host memory 312. The mapping relationship between the Y first logical blocks and the Y second logical blocks (pinned regions) will substantially not change after the initialization, and thus when the mapping relationship between the first logical block and the second logical block is updated subsequently, the mapping relationship between the Y first logical blocks and the Y second logical blocks (pinned regions) will not be repeatedly sent to the host 310.

In some examples, Y consecutive first logical blocks whose allocation state is the first state in the ring queue may be pinned allocated to the Y second logical blocks (pinned regions).

In some examples, Y consecutive first logical blocks whose allocation state is the first state at the head of the ring queue may be pinned allocated to the Y second logical blocks (pinned regions). Y consecutive first logical blocks whose allocation state is the first state at the tail of the ring queue may also be pinned allocated to the Y second logical blocks (pinned regions). Y consecutive first logical blocks whose allocation state is the first state in the middle of the ring queue may be pinned allocated to the Y second logical blocks (pinned regions).

For example, referring to FIG. 7, Y consecutive first logical blocks 602 corresponding to identities of the (M−Y+1)th to M-th first logical blocks in the ring queue are allocated to the Y second logical blocks (pinned regions). For another example, Y first logical blocks corresponding to identities of the 1$^{st}$ to Y-th first logical blocks in the ring queue are allocated to the Y second logical blocks (pinned regions). In other alternative examples, the Y first logical blocks pinned allocated to the Y second logical blocks (pinned regions) may be randomly determined in the ring queue in advance.

In some examples, when the first logical block is allocated to the second logical block meeting the recommendation standard, the first logical block whose allocation state is the third state may be skipped according to the order of the identities of the M first logical blocks in the ring queue.

In some examples, after Y first logical blocks whose allocation state is the third state are determined, identities of these Y first logical blocks may be recorded. When the allocation is to be performed, according to the order of the identities of the M first logical blocks in the ring queue, with respect to the first logical blocks corresponding to the identities of these Y first logical blocks, these Y first logical blocks are skipped.

For example, referring to FIG. 7, the (M−Y+1)th to M-th first logical blocks 602 in the ring queue 600 are first logical blocks in the third state. After the (M−Y)th first logical block is allocated to the corresponding second logical block, the (M−Y+1)th to M-th first logical blocks are skipped, and the first one of the first logical blocks is allocated to the corresponding second logical block.

In some examples, the ring queue includes the pointer that may be used to skip the first logical block whose allocation state is the third state.

For example, after Y consecutive first logical blocks corresponding to identities of the (M−Y+1)th to M-th first logical blocks in the ring queue are allocated to the Y second logical blocks, in a case that one first logical block belongs to the 1st to (M−Y−1)th first logical blocks, the pointer points to the next first logical block of this first logical block.

Figure 8:
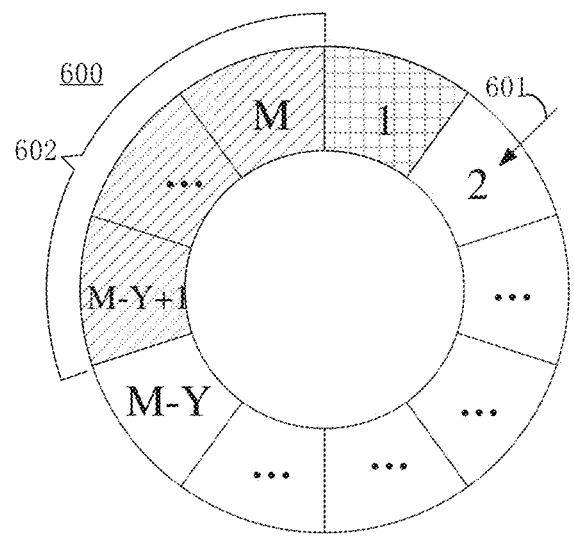
FIG. 8 shows a schematic diagram of a ring queue, according to some examples of the present disclosure.

For example, referring to FIG. 7, in a case that the first logical block pointed to by the pointer 601 is the first one of the first logical blocks and the allocation state of the first one of the first logical blocks is the first state, the first one of the first logical blocks may be directly allocated to the second logical block that currently meets the recommendation standard, the allocation state of the first one of the first logical blocks is updated to the second state, and the pointer 601 is pointed to the second one of the first logical blocks, as shown in FIG. 8. For another example, in a case that the first logical block pointed to by the pointer 601 is the second one of the first logical blocks, the second one of the first logical blocks may be directly allocated to the second logical block that currently meets the recommendation standard, the allocation state of the second one of the first logical blocks is updated to the second state, and the pointer 601 is pointed to the third one of the first logical blocks, and so on.

In some examples, in a case that the one first logical block is the (M−Y)th first logical block, the pointer is pointed to the first one of the first logical blocks.

Figure 9:
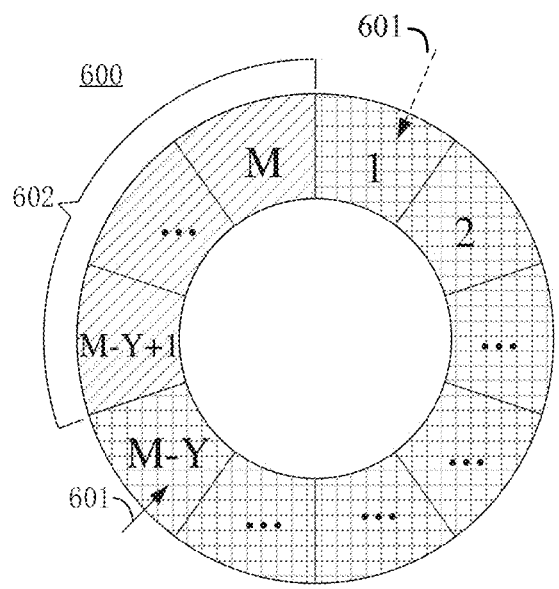
FIG. 9 shows a schematic diagram of a ring queue, according to some examples of the present disclosure.

For example, referring to FIG. 9, in a case that the first logical block pointed to by the pointer 601 is the (M−Y)th first logical block and the allocation state of the (M−Y)th first logical block is the first state, the (M−Y)th first logical block may be directly allocated to the second logical block that currently meets the recommendation standard, the allocation state of the (M−Y)th first logical block is updated to the second state, and the pointer 601 is pointed to the first one of the first logical blocks. In this case, the (M−Y+1)th to M-th first logical blocks 602 whose allocation state is the third state in the ring queue are skipped by the pointer.

Figures 10, 11:
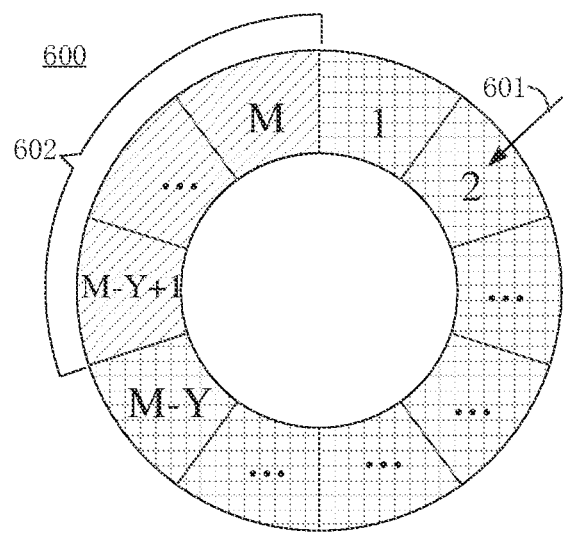
FIG. 10 shows a schematic diagram of a ring queue, according to some examples of the present disclosure.
FIG. 11 shows a schematic diagram of a logical block management table, according to some examples of the present disclosure.

Referring to FIG. 9 and FIG. 10, in a case that the first logical block pointed to by the pointer 601 is the first one of the first logical blocks and the allocation state of the first one of the first logical blocks is the second state, in this case, it is necessary to first de-allocate the second logical block to which the first one of the first logical blocks has been allocated, update the allocation state of the first one of the first logical blocks to the first state, and then again allocate the first one of the first logical blocks to the second logical block currently meeting the recommendation standard (not the same second logical block as the second logical block to which the first one of the first logical blocks was previously allocated), update the allocation state of the first one of the first logical blocks to the second state, and point the pointer 601 to the second one of the first logical blocks. Thereby, the rapid management and allocation of logical block resources may be realized through the ring queue.

In some examples, the method may further includes updating the identity of the first logical block or the identity of the second logical block in the logical block management table.

The logical block management table in some examples of the present disclosure may be the logical block management table A as shown in FIG. 11 to FIG. 15, or the logical block management table B as shown in FIG. 16 to FIG. 20. In some examples, where M may be 8 K, and N may be 32K.

Hereinafter, the updating of the identity of the second logical block in the logical block management table is described by taking the logical block management table A as shown in FIG. 11 to FIG. 15 as an example.

Referring to FIG. 6 and FIG. 11 in combination, a first column in the logical block management table A is the identity of the first logical block, a second column is the identity of the second logical block allocated to the first logical block, and a third column is the allocation state of the first logical block. In an initial stage, the first column is identities 1 to M of the first logical blocks; and at this time, none of the first logical blocks is allocated, so the identity of the second logical block in the second column is an initial value, for example, the identities of the second logical blocks are all 0, and the allocation states in the third column are all the first state, that is, the unallocated state.

Referring to FIG. 7 and FIG. 12 in combination, Y first logical blocks 602 corresponding to the identities of the (M−Y+1)th to M-th first logical blocks in the ring queue 600 are allocated to the Y second logical blocks (pinned regions). Identities of second logical blocks corresponding to the identities of the (M−Y+1)th to M-th first logical blocks in the logical block management table A are updated to X to Z, and allocation states corresponding to the identities of the (M−Y+1)th to M-th first logical blocks in the logical block management table A are updated to the third state.

Referring to FIG. 7, FIG. 8 and FIG. 13 in combination, for example, the second logical block that currently meets the recommendation standard is a second logical block with the identity of 1. In a case that the first logical block pointed to by the pointer 601 is the first one of the first logical blocks and the allocation state of the first one of the first logical blocks is the first state, the first one of the first logical blocks may be directly allocated to the second logical block with the identity of 1. The identity of the second logical block corresponding to the identity of the first one of the first logical blocks in the logical block management table A is updated as 1, the allocation state corresponding to the identity of the first one of the first logical blocks in the logical block management table A is updated to the second state, and the pointer 601 is pointed to the second one of the first logical blocks, and so on, . . . . Referring to FIG. 9, FIG. 10, and FIG. 15 in combination, for example, the second logical block that currently meets the recommendation standard is a second logical block with the identity of (M−Y+1). In a case that the first logical block pointed to by the pointer 601 is the first one of the first logical blocks and the allocation state of the first one of the first logical blocks is the second state, in this case, it is necessary first to de-allocate the second logical block (e.g., the second logical block with the identity of 1) to which the first one of the first logical blocks has been allocated, then allocate again the first one of the first logical blocks to the second logical block with the identity of (M−Y+1), update the identity of the second logical block corresponding to the identity of the first one of the first logical blocks in the logical block management table A from 1 to (M−Y+1), and point the pointer to the second one of the first logical blocks.

Hereinafter, the updating the identity of the first logical block in the logical block management table is described by taking the logical block management table B as shown in FIG. 16 to FIG. 20, as an example.

Referring to FIG. 6 and FIG. 16 in combination, a first column in the logical block management table B is the identity of the second logical block, a second column is the identity of the first logical block to which the second logical block is allocated, and a third column is the allocation state of the first logical block. In an initial stage, the first column is identities 1 to N of the second logical blocks, and at this time, none of the first logical blocks is allocated, so the identity of the first logical block in the second column is an initial value, for example, the identities of the first logical blocks are all 0, and the allocation states in the third column are all the first state, that is, the unallocated state.

Referring to FIG. 7 and FIG. 17 in combination, Y first logical blocks corresponding to the identities of the (M−Y+1)th to M-th first logical blocks in the ring queue 600 are allocated to the Y second logical blocks Block (pinned regions). Identities of first logical blocks corresponding to the identities of the X-th to Z-th second logical blocks in the logical block management table B are updated to (M−Y+1) to M, and allocation states corresponding to the identities of the (M−Y+1)th to M-th first logical blocks in the logical block management table B are updated to the third state.

Referring to FIG. 7, FIG. 8, and FIG. 18 in combination, for example, the second logical block that currently meets the recommendation standard is a second logical block with the identity of 1. In a case that the first logical block pointed to by the pointer 601 is the first one of the first logical blocks and the allocation state of the first one of the first logical blocks is the first state, the first one of the first logical blocks may be directly allocated to the second logical block with the identity of 1. The identity of the first logical block corresponding to the identity of the first second logical block in the logical block management table B is updated as 1, the allocation state corresponding to the first logical block with the identity of 1 in the logical block management table B is updated to the second state, and the pointer 601 is pointed to the second one of the first logical blocks, and so on, . . . . Referring to FIG. 9 and FIG. 19 in combination, for example, the second logical block that currently meets the recommendation standard is a second logical block with the identity of 0X5999. In a case that the first logical block pointed to by the pointer 601 is the (M−Y)-th first logical block and the allocation state of the (M−Y)-th first logical block is the first state, in this case, the (M−Y)-th first logical block may be directly allocated the second logical block with the identity of 0X5999. The identity of the first logical block corresponding to the second logical block with the identity of 0X5999 in the logical block management table B is updated as (M−Y), the allocation state of the (M−Y)-th first logical block is updated to the second state, and the pointer 601 is pointed to the first one of the first logical blocks. Referring to FIG. 9, FIG. 10, and FIG. 20 in combination, for example, the second logical block that currently meets the recommendation standard is a second logical block with the identity of 0X6E2D. In a case that the first logical block pointed to by the pointer 601 is the first one of the first logical blocks and the allocation state of the first one of the first logical blocks is the second state, in this case, it is necessary first to de-allocate the second logical block (e.g., the second logical block with the identity of 1) to which the first one of the first logical blocks has been allocated, update the identity of the first logical block corresponding to the second logical block with the identity of 1 in the logical block management table B to an invalid value (which may be, for example, 0X7FFF), update the state corresponding to the first logical block with the identity of the invalid value to the first state, then allocate again the first one of the first logical blocks to the second logical block with the identity of 0X6E2D, update the identity of the first logical block corresponding to the second logical block with the identity of 0X6E2D as 1, and point the pointer to the second one of the first logical blocks.

In some examples, the method may further include sending the updated logical block management table to the host, and sending a logical address-physical address mapping table (L2P mapping table) corresponding to certain second logical block in the logical block management table to the host.

In some examples of the present disclosure, the memory controller 330 may send the logical block management table to the host 310 at preset time intervals. Alternatively, every time a new second logical block meeting the recommendation standard appears, the memory controller 330 may also allocate the first logical block to the new second logical block meeting the recommendation standard, so as to obtain the updated logical block management table, and sends the updated logical block management table to the host 310. After receiving the recommended second logical block and the mapping relationship between the first logical block and the second logical block, the host 310 may obtain the logical address-physical address mapping table (that is, the L2P mapping table) corresponding to the recommended second logical block from the memory system 320, and store the L2P mapping table in the host memory 312.

In the method for operating the memory system provided by some examples of the present disclosure, on the one hand, the allocation state of the first logical block and an allocation relationship between the first logical block and the second logical block may be dynamically managed through the logical block management table; on the other hand, through the ring queue constructed according to the identities of the M first logical blocks, quick and efficient searching of the first logical block can be realized, which realizes a quick allocation of the corresponding first logical block to the second logical block among the N second logical blocks that meets the recommendation standard, an improvement of the resource-allocation efficiency, an improvement of the random-read performance, and an improvement of the system performance.

In some examples, in a case that there is no first logical block whose allocation state is the first state, the earliest allocated first logical block may be quickly and efficiently located through the ring queue, which realizes to quickly allocate the corresponding first logical block to the second logical block among the N second logical blocks that meets the recommendation standard.

Referring to FIG. 3, some examples of the present disclosure provide a memory system 320, including a memory device 340, and a memory controller 330 coupled to the memory device 340. The memory controller 330 may control the memory device 340 to perform a data storage operation. The memory controller 330 includes an interface (e.g., a host interface 332) communicatively coupled to a host 310, and the host interface 332 communicatively coupled to the host 310 is configured to sequentially send to the host 310 at least part of mapping information in a first logical block management table and a second logical block management table.

The first logical block management table and the second logical block management table respectively represent the mapping relationship between a first logical block and a second logical block at different times. Identities of M first logical blocks are constructed as a ring queue and allocation states of the M first logical blocks are managed through the logical block management table, where M is an integer greater than or equal to 2. The first logical block management table and the second logical block management table each include identities of K first logical blocks whose allocation state is a second state representing an allocated state at the different times, and identities of K second logical blocks among the N second logical blocks to which the K first logical blocks are allocated, where K is an integer greater than 1 and less than or equal to M, and N is an integer greater than M. One first logical block allocated first among the K first logical blocks corresponding to the first logical block management table is updated and allocated to one second logical block among the K second logical blocks in the second logical block management table, to represent an update of the mapping relationship of the second logical block management table relative to the mapping relationship of the first logical block management table.

In some examples of the present disclosure, the host interface 332 may sequentially send to the host 310 all the mapping information in the first logical block management table and the second logical block management table, or may send part of the mapping information (for example, the mapping information in which the second logical block management table is updated relative to the first logical block management table) in the first logical block management table and the second logical block management table.

In some examples, the first logical block management table may be the logical block management table shown in FIG. 11 (that is, an initial state of the logical block management table, in which allocation states corresponding to the first logical blocks are all the first state representing the unallocated state). The second logical block management table may be the logical block management table shown in FIG. 12 or include bold entries in the logical block management table shown in FIG. 12 (that is, Y first logical blocks are in pinned allocation to Y second logical blocks (pinned regions)).

Taking the first logical block management table as the logical block management table shown in FIG. 11 and the second logical block management table as the logical block management table shown in FIG. 12 as an example, in a case that the host interface 332 sends the first logical block management table to the host 310, since the logical block management table shown in FIG. 11 is the initial state of the logical block management table, the host interface 332 sends to the host 310 all mapping entries in the logical block management table shown in FIG. 11 in this case. Then, the host interface 332 sends to the host 310 the second logical block management table, and in this case, the host interface 332 may send to the host 310 all mapping entries in the logical block management table shown in FIG. 12, or may send the updated mapping entries (that is, the bold entries in the logical block management table shown in FIG. 12 (that is, corresponding mapping entries of the pinned Y first logical blocks and Y second logical blocks (pinned regions) to which the Y first logical blocks are in pinned allocation)) in the logical block management table shown in FIG. 12 relative to the logical block management table shown in FIG. 11. The allocation states corresponding to the Y first logical blocks will substantially not change. After the mapping relationship between the Y first logical block sand the Y second logical blocks (pinned regions) is sent to the host 310, the mapping relationship between the Y first logical block sand the Y second logical blocks (pinned regions)) does not need to be repeatedly sent to the host 310 when the mapping relationship between the first logical block and the second logical block is subsequently updated.

In some examples, the first logical block management table may be the logical block management table shown in FIG. 12 or include the bold part in the logical block management table shown in FIG. 12, and the second logical block management table may be the logical block management table shown in FIG. 13 or include bold entries (that is, the first one of the first logical blocks is allocated to the first second logical block) in the logical block management table shown in FIG. 13.

Taking the first logical block management table as the logical block management table shown in FIG. 12 and the second logical block management table as the logical block management table shown in FIG. 13 as an example, when the host interface 332 sends to the host 310 the first logical block management table, the host interface 332 can send to the host 310 all mapping entries in the logical block management table shown in FIG. 12, or may send the updated mapping entries (that is, the bold entries in the logical block management table shown in FIG. 12 (that is, corresponding mapping entries of the pinned Y first logical blocks and the Y second logical blocks (pinned regions) to which the Y first logical blocks are in pinned allocation)) in the logical block management table shown in FIG. 12 relative to the logical block management table shown in FIG. 11. Then, the host interface 332 sends to the host 310 the second logical block management table; and in this case, the host interface 332 may send to the host 310 all the mapping entries in the logical block management table shown in FIG. 13, or may send the updated entries (that is, the bold entries in the logical block management table shown in FIG. 13 (that is, the mapping entry corresponding to the first logical block identity 1 and the second logical block identity 1)) of the logical block management table shown in FIG. 13 relative to the logical block management table shown in FIG. 12.

In some examples, the first logical block management table may be the logical block management table shown in FIG. 13 or include the bold part in the logical block management table shown in FIG. 13, and the second logical block management table may be the logical block management table shown in FIG. 14 or include mapping entries corresponding to the first logical block identities 1 to M−Y in the logical block management table shown in FIG. 14

(that is, the 1$^{st}$ to (M−Y)-th first logical blocks are respectively allocated to the 1$^{st}$ to (M−Y)-th second logical blocks).

Taking the first logical block management table as the logical block management table shown in FIG. 13 and the second logical block management table as the logical block management table shown in FIG. 14 as an example, when sending the first logical block management table to the host 310, the host interface 332 may send to the host 310 all the mapping entries in the logical block management table shown in FIG. 13, or may also send the updated mapping entries (that is, the bold entries in the logical block management table shown in FIG. 13) in the logical block management table shown in FIG. 13 relative to the logical block management table shown in FIG. 12. Then, the host interface 332 sends to the host 310 the second logical block management table, and in this case, the host interface 332 may send to the host 310 all the mapping entries in the logical block management table shown in FIG. 14, or may also send the updated mapping entries (that is, the mapping entries corresponding to the first logical block identities 1 to M−Y in the logical block management table shown in FIG. 14) in the logical block management table shown in FIG. 14 relative to the logical block management table shown in FIG. 13

In some examples, the first logical block management table may be the logical block management table shown in FIG. 14 or include the bold part in the logical block management table shown in FIG. 14, and the second logical block management table may be the logical block management table shown in FIG. 15 or include the bold entries in the logical block management table shown in FIG. 15.

Taking the first logical block management table as the logical block management table shown in FIG. 14 and the second logical block management table as the logical block management table shown in FIG. 15 as an example, when sending the first logical block management table to the host 310, the host interface 332 may send to the host 310 all the mapping entries in the logical block management table shown in FIG. 14, or may also send the updated mapping entries (that is, the mapping entries corresponding to the first logical block identities 1 to M−Y in the logical block management table shown in FIG. 14) in the logical block management table shown in FIG. 14 relative to the logical block management table shown in FIG. 13. Then, the host interface 332 sends to the host 310 the second logical block management table, and in this case, the host interface 332 may send to the host 310 all the mapping entries in the logical block management table shown in FIG. 15, or may also send the updated mapping entries (that is, the bold entries in the logical block management table shown in FIG. 15) in the logical block management table shown in FIG. 15 relative to the logical block management table shown in FIG. 14.

Taking the first logical block management table as the logical block management table shown in FIG. 14 and the second logical block management table as the logical block management table shown in FIG. 15 as an example, at the first logical block that is first allocated (that is, the first logical block corresponding to the identity 1) among the K first logical blocks corresponding to the first logical block management table shown in FIG. 14, the first logical block corresponding to the identity 1 is updated and allocated to a second logical block (that is, the second logical block corresponding to the identity (M−Y+1)) among the K second logical blocks.

In some examples, the first logical block management table may be the logical block management table shown in FIG. 16, and the second logical block management table may be the logical block management table shown in FIG. 17 or include bold entries in the logical block management table shown in FIG. 17.

In some examples, the first logical block management table may be the logical block management table shown in FIG. 17 or include the bold part in the logical block management table shown in FIG. 17, and the second logical block management table may be the logical block management table shown in FIG. 18 or include bold entries in the logical block management table shown in FIG. 18.

In some examples, the first logical block management table may be the logical block management table shown in FIG. 18 or include the bold part in the logical block management table shown in FIG. 18, and the second logical block management table may be the logical block management table shown in FIG. 19 or include bold entries in the logical block management table shown in FIG. 19.

In some examples, the first logical block management table may be the logical block management table shown in FIG. 19 or include the bold part in the logical block management table shown in FIG. 19, and the second logical block management table may be the logical block management table shown in FIG. 20 or include bold entries in the logical block management table shown in FIG. 20.

In some examples, the first logical block management table and the second logical block management table may be adjacent two updates of the logical block management tables between the first logical block and the second logical block that are sent by the host interface 332 to the host 310. The memory controller 330 may update the logical block management table every preset time interval, and use the host interface 332 to send the updated logical block management table to the host. In this case, the first logical block management table is a logical block management table sent by the host interface 332 to the host 310 at time T1 to update the L2P mapping table stored in the host memory 312, and the second logical block management table is a logical block management table sent by the host interface 332 to the host 310 at time T2. A time difference between the time T1 and the time T2 is the preset time interval. The memory controller 330 may also send to the host 310 the updated logical block management table through the host interface 332 each time the logical block management table is updated, to update the L2P mapping table stored in the host memory 312. The memory controller 330 may also send to the host 310 the updated logical block management table through the host interface 332 after the updated mapping relationships between the first logical blocks and second logical blocks reach a certain quantity, to update the L2P mapping table stored in the host memory 312.

In some examples, the first logical block management table includes a first sequence corresponding to the identities of the M first logical blocks, the identities of the M first logical blocks are constructed as the ring queue and the allocation states of the M first logical blocks are managed through the logical block management table. The first logical block management table may include identities of K first logical blocks whose allocation state at a first time is the second state representing the allocated state, and identities of K second logical blocks among the N second logical blocks to which the K first logical blocks are allocated at the first time. The second logical block management table may include identities of K first logical blocks whose allocation state at a second time is the second state representing the allocated state (the identities of the K first logical blocks in the second logical block management table are different from the identities of the K first logical blocks in the first logical block management table), and identities of K second logical blocks among the N second logical blocks to which the K first logical blocks are allocated at the second time. One first logical block among the K first logical blocks corresponding to the first logical block management table that is first allocated is updated and allocated to one second logical block among the K second logical blocks in the second logical block management table, so as to represent the update of the mapping relationship of the second logical block management table relative to the mapping relationship of the first logical block management table.

In some examples of the present disclosure, M represents a number of logical blocks supported by the memory controller of the memory system in an HPB mode, and the N second logical blocks cover all physical addresses of the memory device of the memory system.

In some examples of the present disclosure, both the first logical block management table and the second logical block management table include identities of Y first logical blocks whose allocation state is a third state representing an allocated and pinned state and identities of Y second logical blocks to which the Y first logical blocks are allocated, where Y is an integer greater than 1, and a sum of Y and K is less than or equal to M. The host interface 332 is configured to send to the host 310 K pieces of mapping information in the second logical block management table relative to the first logical block management table.

In some examples of the present disclosure, when the Y first logical blocks are in pinned allocation to the Y second logical blocks (pinned regions), the allocation states of the Y first logical blocks in the logical block management table are updated to the third state. After the logical block management table is updated, the host interface 332 sends to the host 310 the updated logical block management table (for example, the logical block management table shown in FIG. 12 or includes the bold entries in the logical block management table as shown in FIG. 12). When the logical block management table is subsequently updated and sent, only the updated entries (for example, the updated K pieces of mapping information) may be sent, without repeatedly sending the Y pieces of mapping information corresponding to the Y first logical blocks in the logical block management table or other entries that have not been updated.

In some examples of the present disclosure, the host interface 332 is further configured to send to the host 310 a logical address-physical address mapping table corresponding to one second logical block.

FIG. 23 shows a schematic diagram of interaction between a host and a memory system according to some examples of the present disclosure.

In some examples of the present disclosure, referring to FIG. 23, an interaction process between the host 310 and the memory system 320 may include the following operations S2301 to S2306.

At S2301, the host interface 332 in the memory controller 330 sends the first logical block management table to the host 310.

In some examples of the present disclosure, the host interface 332 may send the first logical block management table to the host 310, or may also send part of the mapping information in the first logical block management table to the host 310. The first logical block management table (or part of the mapping information in the first logical block management table) sent by the host interface 332 to the host 310 includes at least one mapping relationship between the first logical block and the second logical block.

At S2302, the host 310 requests the memory system 320 for the L2P mapping table corresponding to the second logical block included in the first logical block management table.

In some examples of the present disclosure, after receiving the first logical block management table (or the part of the mapping information in the first logical block management table), the host 310 requests the memory system 320 for the L2P mapping table corresponding to the second logical block included in the received first logical block management table (or the part of the mapping information in the first logical block management table).

At S2303, the host interface 332 in the memory controller 330 sends to the host 310 the L2P mapping table corresponding to the second logical block included in the first logical block management table, and the L2P mapping table corresponding to the second logical block included in the first logical block management table is stored in the host memory 312 of the host 310.

In some examples of the present disclosure, in response to the request for the L2P mapping table sent by the host 310, the memory system 320 sends to the host 310 the L2P mapping table corresponding to the second logical block included in the first logical block management table (or the part of the mapping information in the first logical block management table) for storage in the host memory 312.

At S2304, the host interface 332 in the memory controller 330 sends the second logical block management table to the host 310.

In some examples of the present disclosure, the memory controller 330 can send the logical block management table to the host 310 every preset time interval. The logical block management tables sent sequentially at one preset time interval are the first logical block management table and the second logical block management table.

In some examples of the present disclosure, every time a new second logical block meeting the recommendation standard appears, the memory controller 330 may also allocate the first logical block to the new second logical block meeting the recommendation standard, so as to obtain the updated logical block management table, and send the updated logical block management table to the host 310. The logical block management table before each update is the first logical block management table, and the logical block management table after the update is the second logical block management table.

In some examples of the present disclosure, the host interface 332 may send the second logical block management table to the host 310, or may also send part of the mapping information in the second logical block management table to the host 310. The second logical block management table (or part of the mapping information in the second logical block management table) sent by the host interface 332 to the host 310 includes at least one mapping relationship between the first logical block and the second logical block.

At S2305, the host 310 requests the memory system 320 for the L2P mapping table corresponding to the second logical block included in the second logical block management table.

In some examples of the present disclosure, after receiving the second logical block management table (or the part of the mapping information in the second logical block management table), the host 310 requests the memory system 320 for the L2P mapping table corresponding to the second logical block included in the received second logical block management table (or the part of the mapping information in the second logical block management table).

At S2306, the host interface 332 in the memory controller 330 sends to the host 310 the L2P mapping table corresponding to the second logical block included in the second logical block management table, and the L2P mapping table corresponding to the second logical block included in the second logical block management table is stored in the host memory 312 of the host 310.

In some examples of the present disclosure, in response to the request for the L2P mapping table sent by the host 310, the memory system 320 sends to the host 310 the L2P mapping table corresponding to the second logical block included in the second logical block management table for storage in the host memory 312.

Referring to FIG. 3, some examples of the present disclosure provide a memory system 320, including a memory device 340, and a memory controller 330 coupled to the memory device 340 and controlling the memory device 340 to perform a data storage operation. The memory controller 330 includes an interface (that is, a host interface 332) communicatively coupled to a host 310, and the host interface 332 is configured to sequentially send to the host 310 the first mapping relationship and the second mapping relationship after two adjacent logical block management table updates are triggered.

The first mapping relationship includes P pieces of mapping information between the first logical block and the second logical block, and the P pieces of mapping information are included in the first logical block management table. The second mapping relationship includes Q pieces of mapping information between the first logical block and the second logical block, and the Q pieces of mapping information are included in the second logical block management table. The first logical block management table and the second logical block management table both include the first sequence corresponding to the identities of the M first logical blocks, the identities of the M first logical blocks are constructed as a ring queue and allocation states of the M first logical blocks are managed through the logical block management table. M is an integer greater than or equal to 2, and P and Q are both integers greater than or equal to 1 and less than or equal to M. One first logical block allocated first among the M first logical blocks corresponding to the first logical block management table is updated and allocated to one second logical block among the Q second logical blocks in the second logical block management table, to represent an update of the mapping relationship in the second logical block management table relative to the mapping relationship in the first logical block management table.

In some examples of the present disclosure, after a certain update of the logical block management table (the logical block management table after the update is referred to as the first logical block management table), the host interface 332 sends to the host 310 the updated mapping information (such as the P pieces of mapping information) in the first logical block management table. After the next update of the certain update (the logical block management table after the update is referred to as the second logical block management table), the host interface 332 sends to the host 310 the updated mapping information in the second logical block management table (for example, the Q pieces of mapping information). In some examples, the first logical block management table obtained in a certain update may be the logical block management table shown in FIG. 12, and the updated mapping information may be the bolded mapping information in FIG. 12. The host interface 332 may send to the host 310 the bolded mapping information in FIG. 12. The second logical block management table obtained in the next update of the certain update may be the logical block management table shown in FIG. 13, and the updated mapping information may be the bolded mapping information in FIG. 13. The host interface 332 may send to the host 310 the bolded mapping information in FIG. 13.

In some examples of the present disclosure, when the host interface 332 sends the updated mapping information to the host 310, the host interface 332 may send to the host 310 the updated mapping information one by one in the form of mapping entry, and each mapping entry may include at least the identity of the first logical block and the identity of the second logical block.

Taking the updated mapping information as the bolded mapping information in FIG. 12 as an example, the host interface 332 may send to the host 310 the mapping entry in FIG. 12 in which the identity of the first logical block is M−Y+1 and the identity of the second logical block is X, and then the host interface 332 sends to the host 310 the mapping entry in FIG. 12 in which the identity of the first logical block is M−Y+2 and the identity of the second logical block is X+1, and then the host interface 332 sends to the host 310 the mapping entry in FIG. 12 in which the identity of the first logical block is M and the identity of the second logical block is Z.

Taking the updated mapping information as the mapping information corresponding to the first logical block identities 1 to M−Y in FIG. 14 as an example, the host interface 332 may send to the host 310 the mapping entry in FIG. 14 in which the identity of the first logical block is 1 and the identity of the second logical block is 1, and then the host interface 332 may send to the host 310 the mapping entry in FIG. 14 in which the identity of the first logical block is 2 and the identity of the second logical block is 2, . . . and then the host interface 332 may send to the host 310 the mapping entry in FIG. 14 in which the identity of the first logical block is M−Y and the identity of the second logical block is M−Y. That is, the host interface may send to the host 310 the updated mapping information one by one in the form of mapping entry.

In some examples, the first logical block management table obtained in a certain update may be the logical block management table shown in FIG. 14, and the updated mapping information may be the bolded mapping information in FIG. 14. The host interface 332 may send to the host 310 the bolded mapping information in FIG. 14. The second logical block management table obtained in the next update of the certain update may be the logical block management table shown in FIG. 15, and the updated mapping information may be the bolded mapping information in FIG. 15. The host interface 332 may send to the host 310 the bolded mapping information in FIG. 15.

Taking the first logical block management table as the logical block management table shown in FIG. 14 and the second logical block management table as the logical block management table shown in FIG. 15 as an example, at the first logical block that is first allocated (that is, the first logical block corresponding to the identity 1) among the M first logical blocks corresponding to the first logical block management table shown in FIG. 14, the first logical block corresponding to the identity 1 is updated and allocated to one second logical block (that is, the second logical block corresponding to the identity (M−Y+1)) among the Q second logical blocks.

In some examples, the first logical block management table obtained in a certain update may be the logical block management table shown in FIG. 17, and the updated mapping information may be the bolded mapping information in FIG. 17. The host interface 332 may send to the host 310 the bolded mapping information in FIG. 17. The second logical block management table obtained in the next update of the certain update may be the logical block management table shown in FIG. 18, and the updated mapping information may be the bolded mapping information in FIG. 18. The host interface 332 may send to the host 310 the bolded mapping information in FIG. 18.

Since a principle of system examples solving the problems is similar to that of the foregoing method examples, implementations of the system examples can refer to implementations of the foregoing method examples, and repeated descriptions will not be given.

Some examples of the present disclosure provide a non-transitory computer-readable storage medium having computer instructions stored thereon, which, when being executed, perform any method for operating the memory system as described above. The computer instructions are adapted to be loaded by a processor and execute the method for operating the memory system provided by each step in any of the above-mentioned examples. For details, reference may be made to the implementation provided by each step in any of the above-mentioned examples, which will not be repeated here. In addition, the description of the beneficial effect of adopting the same method will not be repeated here. For the technical details not disclosed in examples of the computer-readable storage medium involved in the present disclosure, reference may be made to the description of the method examples of the present disclosure. As an example, a computer program may be deployed to be executed on a computer device, or on a plurality of computer devices at one site, or on a plurality of computer devices distributed across a plurality of sites and interconnected by a communication network.

Some examples of the present disclosure further provide a computer program product or a computer program. The computer program product or the computer program includes computer instructions stored in a computer-readable storage medium. A processor of a computer device reads the computer instructions from the computer-readable storage medium, and the processor executes the computer instructions, so that the computer device executes the methods provided in the various optional implementations in any of the foregoing examples.

Those of ordinary skill in the art will appreciate that the schematic units and algorithm operations described according to examples disclosed herein can be carried out by electronic hardware, computer software or a combination thereof. In order to clearly illustrate the interchangeability of hardware and software, the composition and steps of each example have been generally described in terms of functions in this specification. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

The methods and related devices provided in examples of the present disclosure are described with reference to the method flowcharts and/or structural diagrams provided in examples of the present disclosure, and each flow and/or block of the method flowchart and/or structural schematic diagram, and the combination of flow and/or block in the flowchart and/or block diagram can be specifically realized by computer program instructions. These computer program instructions may be provided to a general purpose computer, a special purpose computer, an embedded processor, or a processor of the other programmable application display device to produce a machine, so that the instructions executed by the computer or the processor of the other programmable application display device produce a device configured to implement functions specified in one or more flows of the flowchart and/or one or more blocks of the structural schematic diagram. These computer program instructions may also be stored in a computer-readable memory capable of directing a computer or other programmable application display devices to operate in a particular manner, so that the instructions stored in the computer-readable memory produce an article of manufacture including an instruction device, and the instruction device implements functions specified in one or more flows of the flowchart and/or one or more blocks of the structural schematic diagram. These computer program instructions may also be loaded on a computer or other programmable application display devices, so that a series of operation steps are performed on the computer or other programmable device to produce a computer-implemented process. Thus, instructions executed on the computer or other programmable devices provide steps for implementing functions specified in one or more flows of the flowchart and/or one or more blocks of the structural schematic diagram.

Other examples of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and examples are illustrative, and the real scope and spirit of the present disclosure is defined by the appended claims.

What is claimed is:

1. A method of operating a memory system, comprising:
providing a logical block management table, wherein the logical block management table comprises a first sequence corresponding to identities of M first logical blocks, the identities of the M first logical blocks are constructed as a ring queue, and allocation states of the M first logical blocks are managed through the logical block management table, wherein M is an integer greater than or equal to 2; and
allocating, according to an order of the identities of the M first logical blocks in the ring queue, one first logical block whose allocation state is a first state representing an unallocated state to one second logical block among N second logical blocks, wherein N is an integer greater than M, and updating the allocation state of the one first logical block in the logical block management table from the first state to a second state representing an allocated state.

2. The method of claim 1, wherein M represents a number of logical blocks supported by a memory controller of the memory system in a host performance booster (HPB) mode, and the N second logical blocks cover all physical addresses of a memory device of the memory system.

3. The method of claim 1, further comprising:
in a case of no first logical block whose corresponding allocation state is the first state in the ring queue, de-allocating the second logical block corresponding to the first logical block that is first updated to the second state, and updating the allocation state corresponding to the first logical block that is first identified as the second state to the first state.

4. The method of claim 1, wherein:
the ring queue comprises a pointer, configured to sequentially point to one of the M first logical blocks according to an order of the identities of the M first logical blocks in the ring queue; and
the method further comprises:
  in response to the allocation state of the first logical block pointed to by the pointer being the second state, de-allocating the second logical block corresponding to the first logical block that is first updated to the second state, and updating the allocation state corresponding to the first logical block that is first identified as the second state to the first state.

5. The method of claim 4, further comprising:
allocating the first logical block pointed to by the pointer to one second logical block among the N second logical blocks, and pointing the pointer to a next first logical block in the order of the identities of the M first logical blocks in the ring queue.

6. The method of claim 1, further comprising:
allocating Y first logical blocks whose allocation state is the first state to Y second logical blocks among the N second logical blocks, wherein Y is an integer greater than 1 and smaller than M, and updating the allocation states of the Y first logical blocks in the logical block management table from the first state to a third state representing an allocated and pinned state.

7. The method of claim 6, wherein the allocating the Y first logical blocks whose allocation state is the first state to the Y second logical blocks among the N second logical blocks comprises:
allocating Y consecutive first logical blocks whose allocation state is the first state in the ring queue to the Y second logical blocks.

8. The method of claim 6, wherein the first logical block whose allocation state is the third state is skipped according to the order of the identities of the M first logical blocks in the ring queue.

9. The method of claim 1, wherein:
the logical block management table further comprises a second sequence corresponding to identities of the N second logical blocks; and
the method further comprises:
  updating the identity of the one first logical block or the identity of the one second logical block in the logical block management table.

10. The method of claim 1, wherein a number of elements in the ring queue is the same as a number of first logical blocks, and each element stores the identity and the allocation state of a corresponding first logical block.

11. The method of claim 1, wherein a size of the first logical block is the same as a size of the second logical block.

12. The method of claim 1, further comprising:
after updating the logical block management table, sending the logical block management table to a host.

13. The method of claim 12, further comprising:
sending an L2P mapping table corresponding to the one second logical block to the host.

14. A memory system, comprising:
a memory device, and a memory controller coupled to the memory device and configured to control the memory device to perform a data storage operation;
  wherein the memory controller comprises an interface communicatively coupled to a host and configured to sequentially send to the host at least part of mapping information in a first logical block management table and a second logical block management table;
  wherein the first logical block management table and the second logical block management table respectively represent a mapping relationship between a first logical block and a second logical block at different times, each of the first logical block management table and the second logical block management table comprises a first sequence corresponding to identities of M first logical blocks, the identities of the M first logical blocks are constructed as a ring queue and allocation states of the M first logical blocks are managed through the first logical block management table and the second logical block management table, wherein M is an integer greater than or equal to 2;
  wherein the first logical block management table and the second logical block management table respectively comprise identities of K first logical blocks whose allocation state is a second state representing an allocated state, and identities of K second logical blocks among N second logical blocks to which the K first logical blocks are allocated, at the different times, wherein K is an integer greater than 1 and less than or equal to M, and N is an integer greater than M; and
  wherein one first logical block allocated first among the K first logical blocks corresponding to the first logical block management table is updated and allocated to one second logical block among the K second logical blocks in the second logical block management table, to represent an update of the mapping relationship of the second logical block management table relative to the mapping relationship of the first logical block management table.

15. The system of claim 14, wherein M represents a number of logical blocks supported by the memory controller of the memory system in a host performance booster (HPB) mode, and the N second logical blocks cover all physical addresses of the memory device of the memory system.

16. The system of claim 14, wherein:
both the first logical block management table and the second logical block management table comprise identities of Y first logical blocks whose allocation state is a third state representing an allocated and pinned state and identities of Y second logical blocks to which the Y first logical blocks are allocated, wherein Y is an integer greater than 1, and a sum of Y and K is less than or equal to M; and
the interface is configured to send to the host K pieces of mapping information in the second logical block management table that are updated relative to the first logical block management table.

17. The system of claim 14, wherein the interface is further configured to send to the host an L2P mapping table corresponding to the one second logical block.

18. A memory system, comprising:
a memory device, and a memory controller coupled to the memory device and configured to control the memory device to perform a data storage operation;

wherein the memory controller comprises an interface communicatively coupled to a host;
wherein the interface is configured to sequentially send to the host a first mapping relationship and a second mapping relationship upon trigger of two adjacent updates of a logical block management table;
wherein the first mapping relationship comprises P pieces of mapping information of a first logical block and a second logical block, the P pieces of mapping information are comprised in a first logical block management table, and the second mapping relationship comprises Q pieces of mapping information of the first logical block and the second logical block, the Q pieces of mapping information are comprised in second logical block management table, each of the first logical block management table and the second logical block management table comprises a first sequence corresponding to identities of M first logical blocks, and the identities of the M first logical blocks are constructed as a ring queue and allocation states of the M first logical blocks are managed through the logical block management table, wherein M is an integer greater than or equal to 2, and both P and Q are integers greater than or equal to 1 and less than or equal to M; and
wherein one first logical block allocated first among the M first logical blocks corresponding to the first logical block management table is updated and allocated to one second logical block among Q second logical blocks in the second logical block management table, to represent an update of the mapping relationship in the second logical block management table relative to the mapping relationship in the first logical block management table.

19. The system of claim 18, wherein M represents a number of logical blocks supported by the memory controller of the memory system in a host performance booster (HPB) mode, and a number of the second logical blocks is N, wherein N is an integer greater than M, and N second logical blocks cover all physical addresses of the memory device of the memory system.

20. The system of claim 18, wherein the interface is further configured to send to the host an L2P mapping table corresponding to the one second logical block.

* * * * *